(12) United States Patent
Kamei et al.

(10) Patent No.: US 6,718,140 B1
(45) Date of Patent: Apr. 6, 2004

(54) OPTICAL WAVELENGTH DIVISION MULTIPLEXING TRANSMISSION NETWORK DEVICE

(75) Inventors: Shin Kamei, Mito (JP); Senichi Suzuki, Mito (JP); Akimasa Kaneko, Mito (JP); Kuniharu Kato, Ibaraki-ken (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 601 days.

(21) Appl. No.: 09/635,526

(22) Filed: Aug. 9, 2000

(30) Foreign Application Priority Data

Aug. 13, 1999 (JP) .............................................. 11-229174

(51) Int. Cl.[7] .......................... H04J 14/00; H04J 14/02
(52) U.S. Cl. ............................. 398/68; 398/72; 398/82
(58) Field of Search ................................ 359/124, 127, 359/128, 139; 398/68, 72, 82, 45, 95

(56) References Cited

U.S. PATENT DOCUMENTS 5,745,612 A * 4/1998 Wang et al. ................... 385/24
6,288,808 B1 * 9/2001 Lee et al. ..................... 398/49
6,366,378 B1 * 4/2002 Tervonen et al. ............. 398/87

FOREIGN PATENT DOCUMENTS

JP          2000-47042         2/2000

* cited by examiner

Primary Examiner—Jason Chan
Assistant Examiner—Dzung Tran
(74) Attorney, Agent, or Firm—Thelen Reid & Priest LLP

(57) ABSTRACT

The object of the present invention is to provide a full-mesh optical wavelength division multiplexing transmission network device which is capable of exhibiting excellent communication quality and being mass produced, by reducing the accumulation number of coherent crosstalk lights, without any modification of constituent components constituting the conventional one. In the full-mesh optical wavelength division multiplexing transmission network device, provided is an N×N wavelength multi/demultiplexer having a periodic wavelength demultiplexing property in input/output combination, which performs input/output from/to first and second I/O port groups for optical signals and allows lightwaves traveling in opposite directions not to interfere with each other within the circut, thus reducing the accumulation number of coherent crosstalk lights in WDM wavelength lights and improving S/N of a received light. Particularly, by preventing the accumulation of adjacent crosstalk lights, communications with higher quality can be achieved.

7 Claims, 29 Drawing Sheets

FIG.2

| TRANSMITTING AND RECEIVING APPARATUS | | (4) | (2) | (1) | (3) |
|---|---|---|---|---|---|
| AWG I/O PORT | SECOND PORT GROUP | 1 | 2 | 3 | 4 |
| FIRST PORT GROUP | | | | | |
| TRANSMITTING AND RECEIVING APPARATUS | | | | | |
| (1) | 1 | ↑$\lambda_1$ | ↓$\lambda_2$ | ↑$\lambda_3$ | ↓$\lambda_4$ |
| (2) | 2 | ↓$\lambda_2$ | ↑$\lambda_3$ | ↓$\lambda_4$ | ↑$\lambda_1$ |
| (3) | 3 | ↓$\lambda_3$ | ↑$\lambda_4$ | ↓$\lambda_1$ | ↑$\lambda_2$ |
| (4) | 4 | ↑$\lambda_4$ | ↓$\lambda_1$ | ↑$\lambda_2$ | ↓$\lambda_3$ |

FIG.6

| TRANSMITTING AND RECEIVING APPARATUS | | (8) | (6) | (4) | (2) | (1) | (3) | (5) | (7) |
|---|---|---|---|---|---|---|---|---|---|
| AWG I/O PORT | | 1 | 2 | 3 | 4 | 5 | 6 | 7 | 8 |
| TRANSMITTING AND RECEIVING APPARATUS | FIRST PORT GROUP \ SECOND PORT GROUP | | | | | | | | |
| (1) | 1 | ↑$\lambda_1$ | ↓$\lambda_2$ | ↑$\lambda_3$ | ↓$\lambda_4$ | ↑$\lambda_5$ | ↓$\lambda_6$ | ↑$\lambda_7$ | ↓$\lambda_8$ |
| (2) | 2 | ↓$\lambda_2$ | ↑$\lambda_3$ | ↓$\lambda_4$ | ↑$\lambda_5$ | ↓$\lambda_6$ | ↑$\lambda_7$ | ↓$\lambda_8$ | ↑$\lambda_1$ |
| (3) | 3 | ↓$\lambda_3$ | ↓$\lambda_4$ | ↓$\lambda_5$ | ↑$\lambda_6$ | ↓$\lambda_7$ | ↑$\lambda_8$ | ↓$\lambda_1$ | ↑$\lambda_2$ |
| (4) | 4 | ↑$\lambda_4$ | ↓$\lambda_5$ | ↑$\lambda_6$ | ↓$\lambda_7$ | ↑$\lambda_8$ | ↓$\lambda_1$ | ↑$\lambda_2$ | ↓$\lambda_3$ |
| (5) | 5 | ↑$\lambda_5$ | ↓$\lambda_6$ | ↑$\lambda_7$ | ↓$\lambda_8$ | ↑$\lambda_1$ | ↓$\lambda_2$ | ↓$\lambda_3$ | ↓$\lambda_4$ |
| (6) | 6 | ↓$\lambda_6$ | ↑$\lambda_7$ | ↓$\lambda_8$ | ↑$\lambda_1$ | ↓$\lambda_2$ | ↑$\lambda_3$ | ↓$\lambda_4$ | ↑$\lambda_5$ |
| (7) | 7 | ↓$\lambda_7$ | ↓$\lambda_8$ | ↑$\lambda_1$ | ↓$\lambda_2$ | ↓$\lambda_3$ | ↑$\lambda_4$ | ↓$\lambda_5$ | ↑$\lambda_6$ |
| (8) | 8 | ↑$\lambda_8$ | ↓$\lambda_1$ | ↑$\lambda_2$ | ↓$\lambda_3$ | ↑$\lambda_4$ | ↓$\lambda_5$ | ↑$\lambda_6$ | ↓$\lambda_7$ |

FIG.10

| TRANSMITTING AND RECEIVING APPARATUS | AWG I/O PORT | | (16) | (14) | (12) | (10) | (8) | (6) | (4) | (2) | (1) | (3) | (5) | (7) | (9) | (11) | (13) | (15) |
|---|---|---|---|---|---|---|---|---|---|---|---|---|---|---|---|---|---|---|
| | SECOND PORT GROUP | | 1 | 2 | 3 | 4 | 5 | 6 | 7 | 8 | 9 | 10 | 11 | 12 | 13 | 14 | 15 | 16 |
| | FIRST PORT GROUP | | | | | | | | | | | | | | | | | |
| (1) | | 1 | ↑λ₁ | ↓λ₂ | ↑λ₃ | ↓λ₄ | ↑λ₅ | ↓λ₆ | ↑λ₇ | ↓λ₈ | ↑λ₉ | ↓λ₁₀ | ↑λ₁₁ | ↓λ₁₂ | ↑λ₁₃ | ↓λ₁₄ | ↑λ₁₅ | ↓λ₁₆ |
| (2) | | 2 | ↓λ₂ | ↑λ₃ | ↓λ₄ | ↑λ₅ | ↓λ₆ | ↑λ₇ | ↓λ₈ | ↑λ₉ | ↓λ₁₀ | ↑λ₁₁ | ↓λ₁₂ | ↑λ₁₃ | ↓λ₁₄ | ↑λ₁₅ | ↓λ₁₆ | ↑λ₁ |
| (3) | | 3 | ↑λ₃ | ↓λ₄ | ↑λ₅ | ↓λ₆ | ↑λ₇ | ↓λ₈ | ↑λ₉ | ↓λ₁₀ | ↑λ₁₁ | ↓λ₁₂ | ↑λ₁₃ | ↓λ₁₄ | ↑λ₁₅ | ↓λ₁₆ | ↑λ₁ | ↓λ₂ |
| (4) | | 4 | ↓λ₄ | ↑λ₅ | ↓λ₆ | ↑λ₇ | ↓λ₈ | ↑λ₉ | ↓λ₁₀ | ↑λ₁₁ | ↓λ₁₂ | ↑λ₁₃ | ↓λ₁₄ | ↑λ₁₅ | ↓λ₁₆ | ↑λ₁ | ↓λ₂ | ↑λ₃ |
| (5) | | 5 | ↑λ₅ | ↓λ₆ | ↑λ₇ | ↓λ₈ | ↑λ₉ | ↓λ₁₀ | ↑λ₁₁ | ↓λ₁₂ | ↑λ₁₃ | ↓λ₁₄ | ↑λ₁₅ | ↓λ₁₆ | ↑λ₁ | ↓λ₂ | ↑λ₃ | ↓λ₄ |
| (6) | | 6 | ↓λ₆ | ↑λ₇ | ↓λ₈ | ↑λ₉ | ↓λ₁₀ | ↑λ₁₁ | ↓λ₁₂ | ↑λ₁₃ | ↓λ₁₄ | ↑λ₁₅ | ↓λ₁₆ | ↑λ₁ | ↓λ₂ | ↑λ₃ | ↓λ₄ | ↑λ₅ |
| (7) | | 7 | ↑λ₇ | ↓λ₈ | ↑λ₉ | ↓λ₁₀ | ↑λ₁₁ | ↓λ₁₂ | ↑λ₁₃ | ↓λ₁₄ | ↑λ₁₅ | ↓λ₁₆ | ↑λ₁ | ↓λ₂ | ↑λ₃ | ↓λ₄ | ↑λ₅ | ↓λ₆ |
| (8) | | 8 | ↓λ₈ | ↑λ₉ | ↓λ₁₀ | ↑λ₁₁ | ↓λ₁₂ | ↑λ₁₃ | ↓λ₁₄ | ↑λ₁₅ | ↓λ₁₆ | ↑λ₁ | ↓λ₂ | ↑λ₃ | ↓λ₄ | ↑λ₅ | ↓λ₆ | ↑λ₇ |
| (9) | | 9 | ↑λ₉ | ↓λ₁₀ | ↑λ₁₁ | ↓λ₁₂ | ↑λ₁₃ | ↓λ₁₄ | ↑λ₁₅ | ↓λ₁₆ | ↑λ₁ | ↓λ₂ | ↑λ₃ | ↓λ₄ | ↑λ₅ | ↓λ₆ | ↑λ₇ | ↓λ₈ |
| (10) | | 10 | ↓λ₁₀ | ↑λ₁₁ | ↓λ₁₂ | ↑λ₁₃ | ↓λ₁₄ | ↑λ₁₅ | ↓λ₁₆ | ↑λ₁ | ↓λ₂ | ↑λ₃ | ↓λ₄ | ↑λ₅ | ↓λ₆ | ↑λ₇ | ↓λ₈ | ↑λ₉ |
| (11) | | 11 | ↑λ₁₁ | ↓λ₁₂ | ↑λ₁₃ | ↓λ₁₄ | ↑λ₁₅ | ↓λ₁₆ | ↑λ₁ | ↓λ₂ | ↑λ₃ | ↓λ₄ | ↑λ₅ | ↓λ₆ | ↑λ₇ | ↓λ₈ | ↑λ₉ | ↓λ₁₀ |
| (12) | | 12 | ↓λ₁₂ | ↑λ₁₃ | ↓λ₁₄ | ↑λ₁₅ | ↓λ₁₆ | ↑λ₁ | ↓λ₂ | ↑λ₃ | ↓λ₄ | ↑λ₅ | ↓λ₆ | ↑λ₇ | ↓λ₈ | ↑λ₉ | ↓λ₁₀ | ↑λ₁₁ |
| (13) | | 13 | ↑λ₁₃ | ↓λ₁₄ | ↑λ₁₅ | ↓λ₁₆ | ↑λ₁ | ↓λ₂ | ↑λ₃ | ↓λ₄ | ↑λ₅ | ↓λ₆ | ↑λ₇ | ↓λ₈ | ↑λ₉ | ↓λ₁₀ | ↑λ₁₁ | ↓λ₁₂ |
| (14) | | 14 | ↓λ₁₄ | ↑λ₁₅ | ↓λ₁₆ | ↑λ₁ | ↓λ₂ | ↑λ₃ | ↓λ₄ | ↑λ₅ | ↓λ₆ | ↑λ₇ | ↓λ₈ | ↑λ₉ | ↓λ₁₀ | ↑λ₁₁ | ↓λ₁₂ | ↑λ₁₃ |
| (15) | | 15 | ↑λ₁₅ | ↓λ₁₆ | ↑λ₁ | ↓λ₂ | ↑λ₃ | ↓λ₄ | ↑λ₅ | ↓λ₆ | ↑λ₇ | ↓λ₈ | ↑λ₉ | ↓λ₁₀ | ↑λ₁₁ | ↓λ₁₂ | ↑λ₁₃ | ↓λ₁₄ |
| (16) | | 16 | ↓λ₁₆ | ↑λ₁ | ↓λ₂ | ↑λ₃ | ↓λ₄ | ↑λ₅ | ↓λ₆ | ↑λ₇ | ↓λ₈ | ↑λ₉ | ↓λ₁₀ | ↑λ₁₁ | ↓λ₁₂ | ↑λ₁₃ | ↓λ₁₄ | ↑λ₁₅ |

FIG.14

| Transmitting and Receiving Apparatus | | | (4) | (3) | (2) | (1) |
|---|---|---|---|---|---|---|
| | AWG I/O PORT | First Port Group | 1 | 2 | 3 | 4 |
| | | Second Port Group | | | | |
| Receiving Apparatus | | | | | | |
| (1) | | | ↑ $\lambda_1$ | ↑ $\lambda_2$ | ↓ $\lambda_3$ | ↓ $\lambda_4$ |
| (2) | | | ↓ $\lambda_2$ | ↑ $\lambda_3$ | ↑ $\lambda_4$ | ↓ $\lambda_1$ |
| (3) | | | ↓ $\lambda_3$ | ↓ $\lambda_4$ | ↑ $\lambda_1$ | ↑ $\lambda_2$ |
| (4) | | | ↑ $\lambda_4$ | ↓ $\lambda_1$ | ↓ $\lambda_2$ | ↑ $\lambda_3$ |

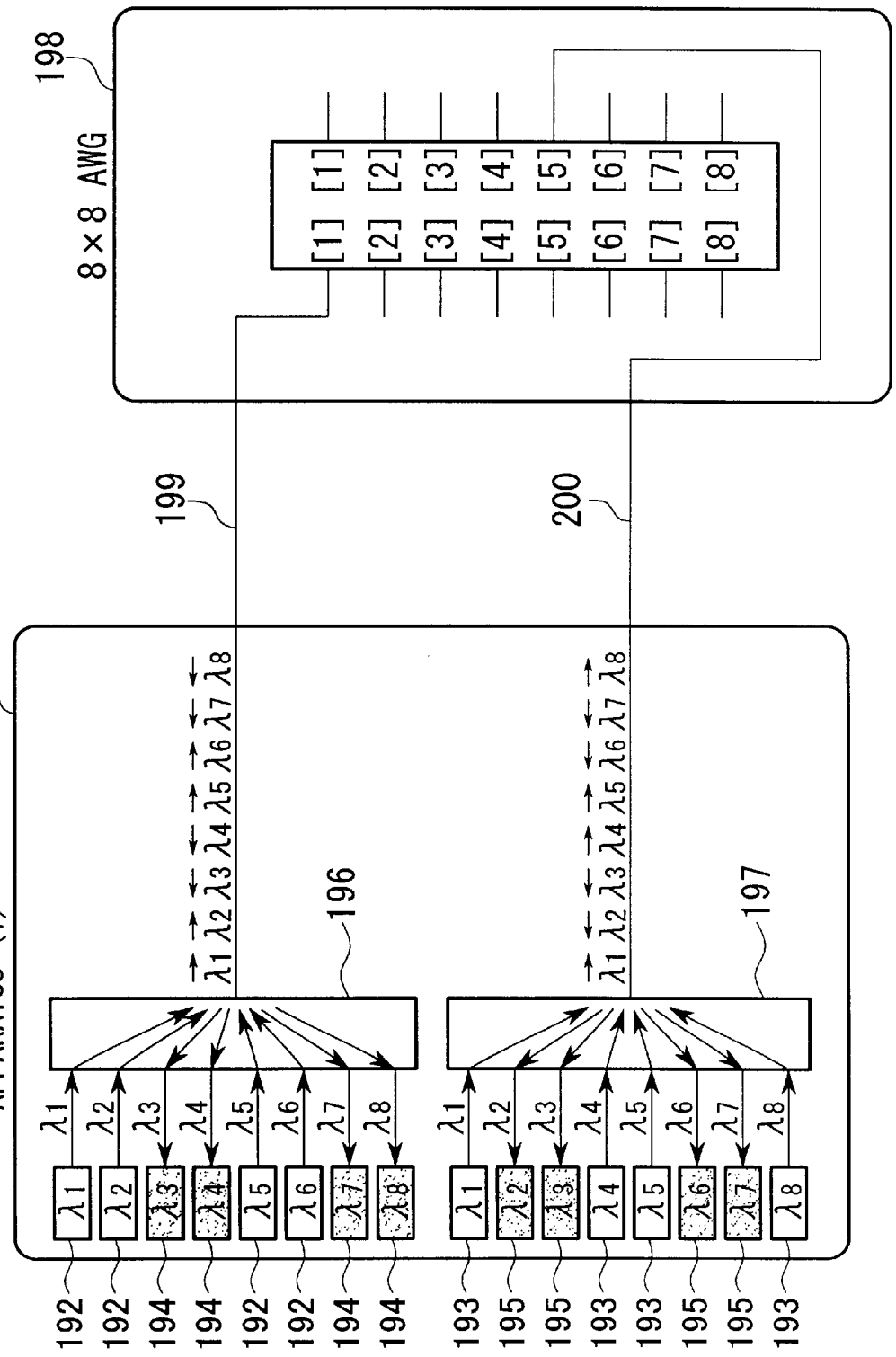

FIG.18

| Transmitting and Receiving Apparatus | AWG I/O Port — First Port Group | (8) | (7) | (6) | (5) | (4) | (3) | (2) | (1) |
|---|---|---|---|---|---|---|---|---|---|
| | Second Port Group | 1 | 2 | 3 | 4 | 5 | 6 | 7 | 8 |
| (1) | 1 | ↑$\lambda_1$ | ↑$\lambda_2$ | ↓$\lambda_3$ | ↓$\lambda_4$ | ↑$\lambda_5$ | ↑$\lambda_6$ | ↓$\lambda_7$ | ↓$\lambda_8$ |
| (2) | 2 | ↓$\lambda_2$ | ↑$\lambda_3$ | ↑$\lambda_4$ | ↓$\lambda_5$ | ↓$\lambda_6$ | ↑$\lambda_7$ | ↑$\lambda_8$ | ↓$\lambda_1$ |
| (3) | 3 | ↑$\lambda_3$ | ↓$\lambda_4$ | ↓$\lambda_5$ | ↑$\lambda_6$ | ↑$\lambda_7$ | ↓$\lambda_8$ | ↑$\lambda_1$ | ↑$\lambda_2$ |
| (4) | 4 | ↑$\lambda_4$ | ↓$\lambda_5$ | ↑$\lambda_6$ | ↓$\lambda_7$ | ↓$\lambda_8$ | ↑$\lambda_1$ | ↓$\lambda_2$ | ↑$\lambda_3$ |
| (5) | 5 | ↓$\lambda_5$ | ↑$\lambda_6$ | ↑$\lambda_7$ | ↓$\lambda_8$ | ↑$\lambda_1$ | ↑$\lambda_2$ | ↓$\lambda_3$ | ↓$\lambda_4$ |
| (6) | 6 | ↓$\lambda_6$ | ↑$\lambda_7$ | ↓$\lambda_8$ | ↓$\lambda_1$ | ↑$\lambda_2$ | ↑$\lambda_3$ | ↑$\lambda_4$ | ↑$\lambda_5$ |
| (7) | 7 | ↓$\lambda_7$ | ↑$\lambda_8$ | ↑$\lambda_1$ | ↓$\lambda_2$ | ↓$\lambda_3$ | ↓$\lambda_4$ | ↑$\lambda_5$ | ↓$\lambda_6$ |
| (8) | 8 | ↓$\lambda_8$ | ↓$\lambda_1$ | ↓$\lambda_2$ | ↑$\lambda_3$ | ↑$\lambda_4$ | ↓$\lambda_5$ | ↑$\lambda_6$ | ↑$\lambda_7$ |

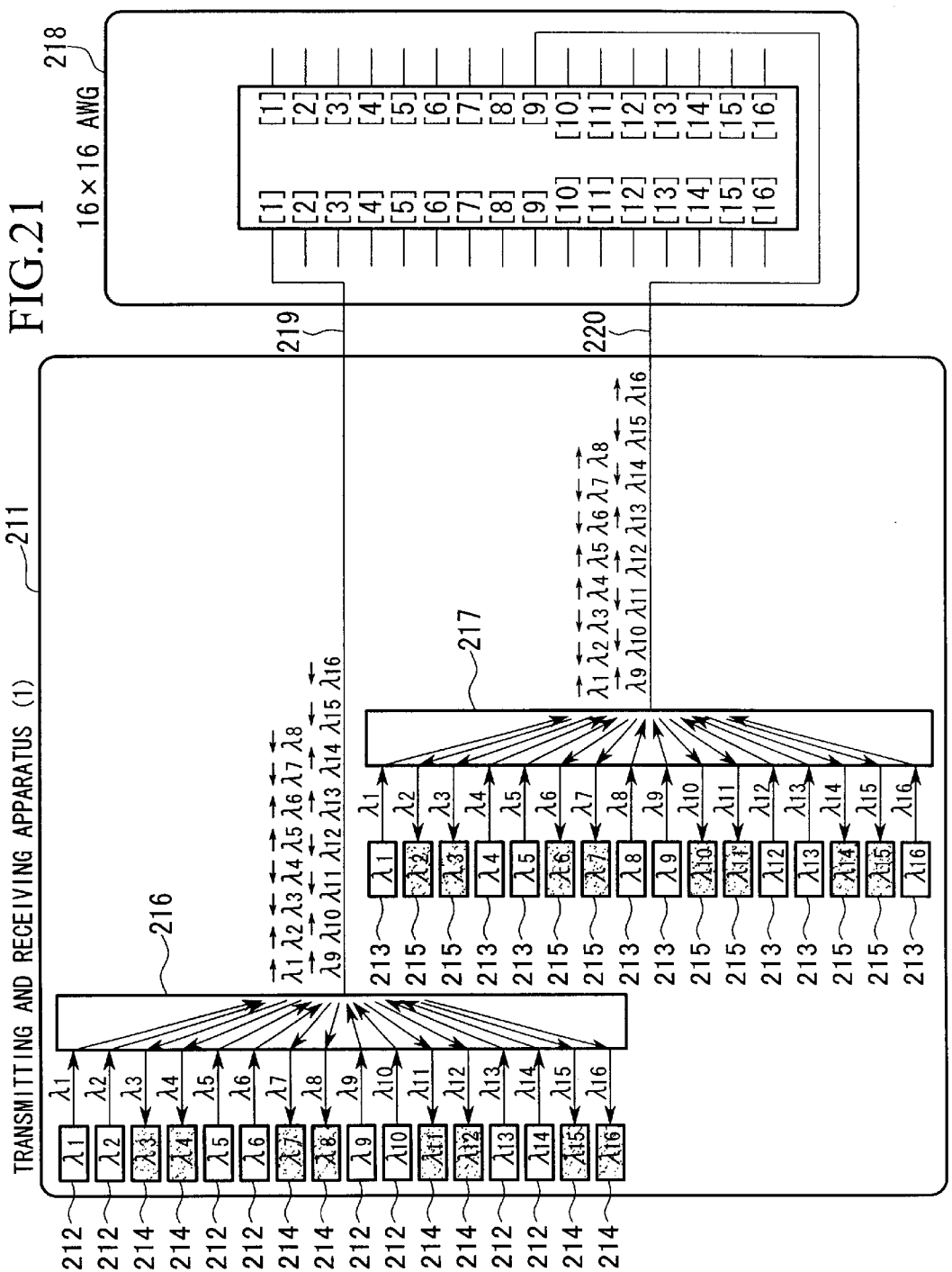

FIG.22

| TRANSMITTING AND RECEIVING APPARATUS | | (16) | (15) | (14) | (13) | (12) | (11) | (10) | (9) | (8) | (7) | (6) | (5) | (4) | (3) | (2) | (1) |
|---|---|---|---|---|---|---|---|---|---|---|---|---|---|---|---|---|---|
| AWG I/O PORT | SECOND PORT GROUP | 1 | 2 | 3 | 4 | 5 | 6 | 7 | 8 | 9 | 10 | 11 | 12 | 13 | 14 | 15 | 16 |
| FIRST PORT GROUP | TRANSMITTING AND RECEIVING APPARATUS | | | | | | | | | | | | | | | | |
| 1 | (1) | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ |
| 2 | (2) | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ | $\lambda_1$ |
| 3 | (3) | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ | $\lambda_1$ | $\lambda_2$ |
| 4 | (4) | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ | $\lambda_1$ | $\lambda_2$ | $\lambda_3$ |
| 5 | (5) | $\lambda_5$ | $\lambda_6$ | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ | $\lambda_1$ | $\lambda_2$ | $\lambda_3$ | $\lambda_4$ |
| 6 | (6) | $\lambda_6$ | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ | $\lambda_1$ | $\lambda_2$ | $\lambda_3$ | $\lambda_4$ | $\lambda_5$ |
| 7 | (7) | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ | $\lambda_1$ | $\lambda_2$ | $\lambda_3$ | $\lambda_4$ | $\lambda_5$ | $\lambda_6$ |
| 8 | (8) | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ | $\lambda_1$ | $\lambda_2$ | $\lambda_3$ | $\lambda_4$ | $\lambda_5$ | $\lambda_6$ | $\lambda_7$ |
| 9 | (9) | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ | $\lambda_1$ | $\lambda_2$ | $\lambda_3$ | $\lambda_4$ | $\lambda_5$ | $\lambda_6$ | $\lambda_7$ | $\lambda_8$ |
| 10 | (10) | $\lambda_{10}$ | $\lambda_{11}$ | $\lambda_{12}$ | $\lambda_{13}$ | $\lambda_{14}$ | $\lambda_{15}$ | $\lambda_{16}$ | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ |
| 11 | (11) | $\lambda_{11}$ | $\lambda_{12}$ | $\lambda_{13}$ | $\lambda_{14}$ | $\lambda_{15}$ | $\lambda_{16}$ | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ |
| 12 | (12) | $\lambda_{12}$ | $\lambda_{13}$ | $\lambda_{14}$ | $\lambda_{15}$ | $\lambda_{16}$ | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ |
| 13 | (13) | $\lambda_{13}$ | $\lambda_{14}$ | $\lambda_{15}$ | $\lambda_{16}$ | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ |
| 14 | (14) | $\lambda_{14}$ | $\lambda_{15}$ | $\lambda_{16}$ | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ | $\lambda_{13}$ |
| 15 | (15) | $\lambda_{15}$ | $\lambda_{16}$ | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ |
| 16 | (16) | $\lambda_{16}$ | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ |

FIG.26

| Transmitting and Receiving Apparatus | AWG I/O Port — Second Port Group | | (1) | (2) | (3) | (4) | (5) | (6) | (7) | (8) |
|---|---|---|---|---|---|---|---|---|---|---|
| | | First Port Group | 1 | 2 | 3 | 4 | 5 | 6 | 7 | 8 |
| (1) | | 1 | ↑$\lambda_1$ | ↑$\lambda_2$ | ↑$\lambda_3$ | ↑$\lambda_4$ | ↑$\lambda_5$ | ↑$\lambda_6$ | ↑$\lambda_7$ | ↑$\lambda_8$ |
| (2) | | 2 | ↑$\lambda_2$ | ↑$\lambda_3$ | ↑$\lambda_4$ | ↑$\lambda_5$ | ↑$\lambda_6$ | ↑$\lambda_7$ | ↑$\lambda_8$ | ↑$\lambda_1$ |
| (3) | | 3 | ↑$\lambda_3$ | ↑$\lambda_4$ | ↑$\lambda_5$ | ↑$\lambda_6$ | ↑$\lambda_7$ | ↑$\lambda_8$ | ↑$\lambda_1$ | ↑$\lambda_2$ |
| (4) | | 4 | ↑$\lambda_4$ | ↑$\lambda_5$ | ↑$\lambda_6$ | ↑$\lambda_7$ | ↑$\lambda_8$ | ↑$\lambda_1$ | ↑$\lambda_2$ | ↑$\lambda_3$ |
| (5) | | 5 | ↑$\lambda_5$ | ↑$\lambda_6$ | ↑$\lambda_7$ | ↑$\lambda_8$ | ↑$\lambda_1$ | ↑$\lambda_2$ | ↑$\lambda_3$ | ↑$\lambda_4$ |
| (6) | | 6 | ↑$\lambda_6$ | ↑$\lambda_7$ | ↑$\lambda_8$ | ↑$\lambda_1$ | ↑$\lambda_2$ | ↑$\lambda_3$ | ↑$\lambda_4$ | ↑$\lambda_5$ |
| (7) | | 7 | ↑$\lambda_7$ | ↑$\lambda_8$ | ↑$\lambda_1$ | ↑$\lambda_2$ | ↑$\lambda_3$ | ↑$\lambda_4$ | ↑$\lambda_5$ | ↑$\lambda_6$ |
| (8) | | 8 | ↑$\lambda_8$ | ↑$\lambda_1$ | ↑$\lambda_2$ | ↑$\lambda_3$ | ↑$\lambda_4$ | ↑$\lambda_5$ | ↑$\lambda_6$ | ↑$\lambda_7$ |

OPTICAL WAVELENGTH DIVISION MULTIPLEXING TRANSMISSION NETWORK DEVICE

BACKGROUND OF THE INVENTION

1. Field of the Invention

The present invention relates to a full-mesh optical wavelength division multiplexing transmission network transmission device for transmitting a plurality of optical signals wavelength-division multiplexed among a plurality of transmitting and receiving apparatuses.

This specification is based on Japanese Patent Application (No. 11(1999)-229174) to Japan Patent Office, and contents described in this Japanese Patent Application will be incorporated as a part of this specification.

2. Descriptions of the Related Art

An optical wavelength division multiplexinging (WDM) transmission system, which transmits a plurality of optical signals on one optical fiber by allocating the signals to different wavelengths, can increase significantly the capacity of its transmission path. In addition, the optical WDM transmission system can perform wavelength addressing which is capable of allocating the destination information relating to the optical signals to the respective wavelengths. Furthermore, a star-type WDM system, in which an N×N wavelength multi/demultiplexer having a periodic wavelength demultiplexing property in input/output combination is arranged in the center so as to connect N transmitting and receiving apparatuses therebetween, can realize a full-mesh WDM transmission network device capable of interconnecting the apparatus through independent N×N signal paths by using only N wavelengths optical signals.

FIG. 25 is a block diagram for explaining a schematic constitution of a conventional full-mesh WDM transmission network device. Referring to FIG. 25, reference numerals 1 to 4 denote transmitting and receiving apparatuses; 5 to 8, transmitters for sending WDM signals (wavelength $\lambda_K$:K=1, 2, ..., N); 9 to 12, receivers for receiving the WDM signals (wavelength $\lambda_K$:K=1, 2, ..., N); 13 to 16, 1×N wavelength multiplexers for multiplexing optical signals having different N wavelengths onto one optical fiber, 17 to 20, 1×N wavelength demultiplexing circuits for demultiplexing the WDM signals wavelength-multiplexed on one optical fiber, into signals having N wavelengths; 21, an N×N wavelength multi/demultiplexer having a periodic wavelength demultiplexing property in input/output combination, which has a first I/O port group (1, 2, ..., N on the left side) composed of N ports and the opposing second I/O port group (1, 2, ..., N on the right side) composed of N ports; and 22 to 29, optical fibers for optically connecting the transmitting and receiving apparatuses 1 to 4, to the I/O ports of the N×N wavelength multi/demultiplexer 21. In the optical fibers 22 to 29, the wavelengths $\lambda_K$ (K=1, 2, ..., N) of the WDM signals propagating on the optical fibers, the signals being wavelength-multiplexed, and the directions of the WDM signals to be transmitted, which are indicated by arrows, are shown.

In this prior art 1×N AWGs (arrayed-waveguide grating wavelength multi/demultiplexer) each having a first I/O port composed of one port and a second I/O port group composed of N ports facing the one first I/O port are used as the 1×N wavelength multiplexers 13 to 16 and the 1×N wavelength demultiplexing circuits 17 to 20. An N×N AWG having a first I/O port group composed of N ports and a second I/O port group composed of N ports facing the first I/O port group and having a periodic wavelength demultiplexing property in input/output combination is used as the N×N wavelength multi/demultiplexer 21.

FIG. 26 is a table showing a periodic wavelength demultiplexing property in input/output combination for N×N AWG (N=8), and a port connection rule between the transmitting and receiving apparatus and the AWG in the conventional full-mesh WDM transmission network device. The N×N AWG having the wavelength demultiplexing property of the periodic input/output relation can be realized by a method recorded in Japanese Patent Application No. 10(1998)-210679, and the like. The wavelength demultiplexing property between eight ports of the first input/output group of the N×N AWG and eight ports of the second input/output group thereof is periodic as shown by the wavelength $\lambda_K$ (K=1, 2, ..., 8) in FIG. 26.

The N×N AWG is a circuit symmetrical with respect to the first I/O port group and the second I/O port group. For example, the multiplexed WDM signal wavelength $\lambda_K$ (K=1, 2, ..., 8) input from a predetermined port of the first I/O port group is wavelength-demultiplexed and output to each port of the second I/O port group. In contrast, the multiplexed WDM signal wavelength $\lambda_K$ (K=1, 2, ..., 8) input from a predetermined port of the second I/O port group is wavelength-demultiplexed and output to each port of the first I/O port group.

The arrows shown above the each wavelength $\lambda_K$ in FIG. 26 express the relation of the input/output among the ports. The arrows toward the right mean that the first I/O port group side is used as an input port and the second I/O port group side is used as an output port, and the arrows toward the left mean that second I/O port group side is used as an input port and the first I/O port group is used as an output port. To be more specific, in the conventional full-mesh WDM transmission network device, the whole of the first I/O port group side is used as the input port, and the whole of the second I/O port group side is used as the output port. Although there are 64 (8×8) paths among 8×8 AWG ports, the 64 paths can be independently established at only 8 wavelengths by using of the periodic wavelength demultiplexing property as shown in FIG, 26.

By connecting the I/O ports of the AWG to each transmitting and receiving apparatus, signals can be transmitted independently therebetween through all the paths which can be established among the eight transmitting and receiving apparatuses. Moreover, since a specified wavelength $\lambda_K$ is allocated to the respective path, if a wavelength corresponding to a receiver is selected on the transmitter side, a wavelength addressing function to transmit the signal automatically to an objective receiver can be realized.

FIG. 27 is a diagram for explaining the wavelength addressing. In FIG. 27, reference numerals 31 to 38 denote eight transmitting and receiving apparatuses (1) to (8), and 39 denotes a 8×8 AWG. The wavelength demultiplexing property of the 8×8 AWG and the port connection rule between each of the transmitting and receiving apparatuses and the 8×8 AWG are described in FIG. 26. An optical signal having a wavelength $\lambda_2$ transmitted from the transmitting and receiving apparatus (1) 31 is guided to the port 1 of the first I/O port group of the 8×8 AWG 39, and switched within the 8×8 AWG 39. The optical signal is then sent to the transmitting and receiving apparatus (2) 32 from the port 2 of the second I/O port group thereof. Similarly, a return signal $\lambda_2$ sent back from the transmitting and receiving apparatus (2) 32 is transmitted to the transmitting and receiving apparatus (1) 31 via the 8×8 AWG 39. For example, optical signals $\lambda_3$ and $\lambda_5$ transmitted from the transmitting and receiving apparatus (1) 31 are automatically delivered to the transmitter (3) 33 and the transmitting and receiving apparatus (5) 35, respectively.

FIG. 28 is a graph showing atypical transmission spectrum property between certain input and output ports of the AWG fabricated as a silica-based planar lightwave circuit. Although a wavelength of an optical signal to be transmitted between the input and output ports is equal to $\lambda_K$, other than this optical signal also an optical signal ($\lambda_1, \lambda_2, \ldots, \lambda_{K-1}$, $\lambda_{K+1}, \ldots, \lambda_N$) input from the same port can be scarcely transmitted therebetween. This is the noise called crosstalk light. An intensity ratio of the crosstalk light to the optical signal is approximately –30 dB with respect to a wavelength ($\lambda_{K-1}, \lambda_{K+1}$) adjacent to the wavelength $\lambda_K$, and approximately –40 dB with respect to other wavelengths ($\lambda_1, \lambda_2, \ldots, \lambda_{K-2}, \lambda_{K+2}, \ldots, \lambda_N$).

In the N×N AWG of the conventional full-mesh WDM transmission network device, the WDM signals of N wavelengths are input from all ports of the first I/O port group. For example, in the case of the 8×8 AWG having the wavelength demultiplexing property of the periodic input/output relation as shown in FIG. 26, the optical signal $\lambda_5$ (thick solid line) which is transmitted from the transmitting and receiving apparatus (1) 31 and input to the 8×8 AWG via the port 1 of the first I/O port group (the port group on the left side of the 8×8 AWG) is output from the port 5 of the second I/O port group (the port group on the right side of the 8×8 AWG), and received by the transmitting and receiving apparatus (5) 35.

Furthermore, the optical signal $\lambda_6$ (thick broken line) which is transmitted from the transmitting and receiving apparatus (2) 32 and input to the 8×8 AWG via the port 2 of the first I/O port group is output from the port 5 of the second I/O port group, and received by the transmitting and receiving apparatus (5) 35. At this time, crosstalk light (thin solid line) of the optical signal $\lambda_5$, which is transmitted from the transmitting and receiving apparatus (2) 32 and input via the port 2 of the first I/O port group, is also output from the port 5 of the second input/output group. Similarly, crosstalk lights of the optical signal $\lambda_5$ transmitted from other transmitting and receiving apparatuses are also output from the port 5 of the second I/O port group. As a result, one optical signal $\lambda_5$ and seven crosstalk lights having the equal wavelength are output from the port 5 of the second I/O port group. The crosstalk lights having equal wavelengths are called coherent crosstalk lights. At this time, since the coherent crosstalk lights from the port 2 and the port 8 of the first I/O port group, that is, the ports cyclically adjacent to the port to which the optical signal $\lambda_5$ is input, are crosstalk light from the adjacent wavelength (adjacent crosstalk light), these coherent crosstalk lights show intensities stronger than those of other five coherent lights.

Like the N×N AWG in the conventional full-mesh WDM transmission network device, when N optical signals having the equal wavelength are input from the same I/O port group side, N–1 coherent crosstalk lights always occur. Moreover, since the coherent crosstalk light is the noise having a wavelength equal to that of the optical signal, the optical signal and the noise cannot be separated from each other by a wavelength demultiplexing circuit of the transmitting and receiving apparatus, and the noise may increase owing to the interference of the plurality of coherent crosstalk lights.

In the conventional full-mesh WDM transmission network device, a certain WDM wavelength light received by the transmitting and receiving apparatus is a sum of one optical signal and N–1 coherent crosstalk lights, and two waves among these waves are the adjacent crosstalk lights. If the optical signal has the longest wavelength $\lambda_N$ or the shortest wavelength $\lambda_1$, one wavelength is the adjacent crosstalk light. Accordingly, a signal noise ratio S/N is expressed as follows:

$$S/N = P_{Signal}/[2 P_{AdjCT} + (N-3) P_{OthCT}] \quad (1)$$

where $P_{AdjCT}$, $P_{OthCT}$ and $P_{Signal}$ are the adjacent crosstalk light intensity, the non-adjacent crosstalk light intensity and the signal light intensity. Assuming that $P_{AdjCT}/P_{Signal}$ is equal to –30 dB and $P_{OthCT}/P_{Signal}$ is equal to –40 dB, S/N is 27 dB when N=4, 26 dB when N=8, and 25 dB when N=16.

As taught by the formula (1), in the conventional full-mesh WDM transmission network device noises created by the coherent crosstalk lights are accumulated with an increase in the number N of the transmitting and receiving apparatuses connected, so that S/N of the WDM wavelength light decreases. This implies that communication quality of the system deteriorates along with scale expansion. In contrast, a system satisfying a predetermined communication quality standard is limited in its scale. This is a serious problem in designing the system.

SUMMARY OF THE INVENTION

The present invention was made in view of such problems, and the object of the present invention is to provide a large scale full-mesh optical wavelength division multiplexing transmission network device which reduces the accumulation number of coherent crosstalk lights that cause noise, and has a communication quality more excellent than the conventional full-mesh optical wavelength division multiplexing transmission network device, without any modification of constituent components constituting the conventional one. The constituent components include a transmitter, a receiver, a 1×N wavelength multi/demultiplexer, an N×N wavelength multi/demultiplexer, and an optical fiber.

The full-mesh optical wavelength division multiplexing transmission network device of the present invention comprises N transmitting and receiving apparatuses; and an N×N wavelength multi/demultiplexer having a first I/O port group composed of N ports connected to a different one of said N transmitting and receiving apparatuses and a second I/O port group composed of N ports connected to a different one of said N transmitting and receiving apparatuses, wherein an optical signal having a different wavelength for each port of the second I/O port group among optical signals having N kinds of wavelength is transmitted between any one of the ports of the first I/O port group and each port of the second I/O port group; an optical signal having a different wavelength for each port of the first I/O port group among optical signals having N kinds of wavelength is transmitted between any one of the ports of the second I/O port group and each port of the first I/O port group; as a result, N port combinations for transmitting optical signals having an equal wavelength exist for each wavelength, among N×N port combinations made by the N ports of the first I/O port group and the N ports of the second I/O ports; among the N port combinations for transmitting the optical signals having the equal wavelength, in M port combinations the optical signals are transmitted from the first I/O port group to the second I/O port group, and in N–M port combinations the optical signals are transmitted from the second I/O port group to the first I/O port group; and the port of the second I/O port group for receiving the optical signal from the port of the first I/O port group connected to the any one of the transmitting and receiving apparatuses and the port of the first I/O port group for receiving the optical signal from the port of the second I/O port group connected to the any one of the transmitting and receiving apparatuses are connected to the different transmitting and receiving apparatus.

In the optical wavelength division multiplexing transmission network device of the invention, N is preferably an even number and M is equal to N/2.

In the optical wavelength division multiplexing transmission network device of the invention, wavelengths of all optical signals transmitted from any one of the ports of one I/O port group to the other I/O port group are preferably different from wavelengths of all optical signals transmitted from a port adjacent to the said one port of the one I/O port group to the other I/O port group.

In the optical wavelength division multiplexing transmission network device of the invention, the transmitting and receiving apparatus preferably further includes: N–M transmitters; M receivers; a 1×N wavelength multi-demultiplexer which demultiplexes an optical signal output from predetermined one port of the first I/O port group into M optical signals having different wavelengths, inputs the demultiplexed optical signals to the different receivers among the M receivers, multiplexes optical signals output from said N–M transmitters into one optical signal, and transmits the multiplexed optical signal to predetermined one port of the first I/O port group; M transmitters, N–M receivers; and a 1×N wavelength multi/demultiplexer which demultiplexes an optical signal output from predetermined one port of the second I/O port group into N–M optical signals having different wavelengths, inputs the demultiplexed optical signals to the different receivers among the N–M receivers, multiplexes optical signals output by said M transmitters into one optical signal, and transmits the multiplexed optical signal to predetermined one port of the first I/O port group.

According to the present invention, a full-mesh optical wavelength division multiplexing transmission network device can be realized, which is capable of reducing the accumulation number of coherent crosstalk lights that cause noise, exhibiting excellent communication quality, and being mass produced, without any modification of constituent components (the transmitters, the receivers the 1×N AWG, the N×N AWG and the optical fiber) constituting the conventional one.

BRIEF DESCRIPTION OF THE DRAWINGS

FIG. 2 is a table showing a wavelength demultiplexing property and a port connection rule for an AWG of the first embodiment of the present invention;

FIG. 6 is a table showing a wavelength demultiplexing property and a port connection rule for an AWG of the second embodiment of the present invention;

FIG. 10 is a table showing a wavelength demultiplexing property and a port connection rule for an AWG of the third embodiment of the present invention;

FIG. 14 is a table showing a wavelength demultiplexing property and a port connection rule for an AWG of the fourth embodiment of the present invention;

FIG. 17 is a block diagram for explaining a schematic constitution of a fifth embodiment of the present invention;

FIG. 18 is a table showing a wavelength demultiplexing property and a port connection rule for an AWG of the fifth embodiment of the present invention;

FIG. 21 is a block diagram for explaining a schematic constitution of a sixth embodiment of the present invention;

FIG. 22 is a table showing a wavelength demultiplexing property and a port connection rule for an AWG of the sixth embodiment of the present invention;

FIG. 26 is a table showing a wavelength demultiplexing property of a conventional 8×8 AWG and a port connection rule;

DETAILED DESCRIPTION OF THE PREFERRED EMBODIMENTS

Embodiments of the present invention will be described below.

It should be noted that the embodiments described below do not limit the spirt and scope of the invention defined by the claims.

To achieve the object of the present invention, all combinations of features described in the embodiments are not always necessary.

Embodiment 1

Figure 1:
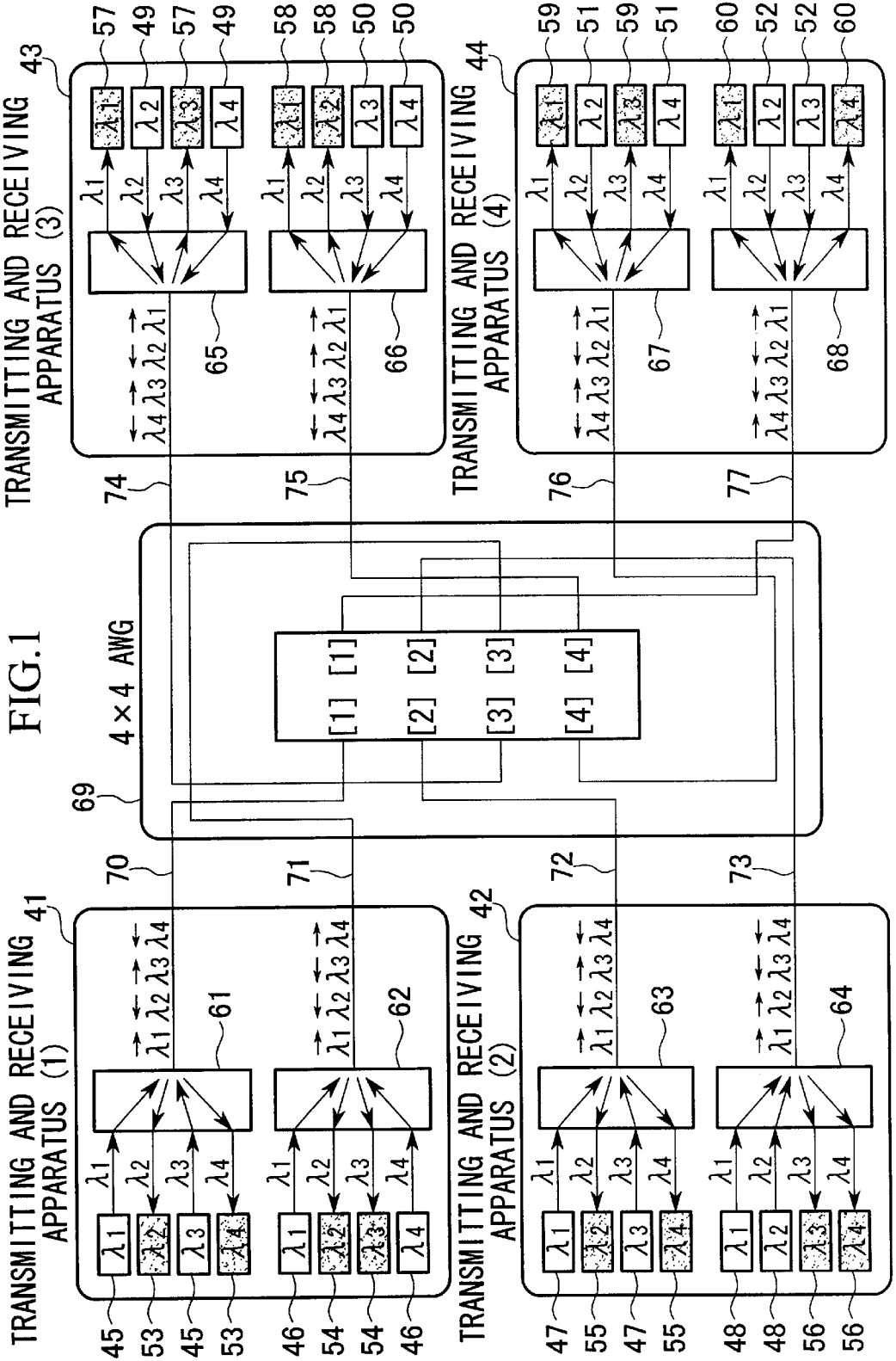
FIG. 1 is a block diagram for explaining a schematic constitution of a first embodiment of the present invention.

FIG. 1 is a block diagram for explaining a first embodiment of the present invention, which shows a schematic constitution of a full-mesh WDM transmission network device of N=4. Referring to FIG. 1, reference numerals 41 to 44 denote a transmitting and receiving apparatus; 45 to 52, a transmitter for sending a WDM signal (wavelength $\lambda_K$: K=1, 2, 3, 4); 53 to 60, a receiver for receiving a WDM signal (wavelength $\lambda_K$: K=1, 2, 3, 4); 61 to 68, a 1×4 wavelength multi/demultiplexer which multiplexes optical signals of two different wavelengths into one optical fiber and demultiplexes a WDM signal which is wavelength-multiplexed to one optical fiber, into two wavelengths; 69, a 4×4 wavelength multi/demultiplexer having a first I/O port group (1 to 4 on the left side) composed of four ports and a second I/O port group (1 to 4 on the right side) composed of four ports, the 4×4 wavelength multi/demultiplexer having a periodic wavelength demultiplexing property in input/output combination; and 70 to 77, an optical fiber for optically connecting each of the transmitting and receiving apparatuses 41 to 44 and each of the I/O ports of the 4×4 wavelength multi/demultiplexes 69. In FIG. 1, shown are the wavelengths ($\lambda_K$: K=1, 2, 3, 4) of the WDM signal wavelength-multiplexed and transmitted on the corresponding optical fiber 70 to 77, and the transmission directions (arrow) thereof.

In this embodiment, as the 1×4 wavelength multi/demultiplexes 61 to 68, a 1×4 AWG (array waveguide diffraction grating) wavelength multi/demultiplexer was used, and as the 4×4 wavelength multi/demultiplexer 69, a 4×4 AWG having a periodic wavelength demultiplexing property in input/output combination was used. Constituent components (a transmitter, a receiver, a 1×4 AWG, a 4×4 AWG and an optical fiber) constituting the full-mesh WDM transmission network device of this embodiment are the same as those of the prior art. Note that while the 1×4 AWG was used exclusively for the wavelength multiplexer or the wavelength demultiplexing circuit in the prior art in this embodiment of the present invention the 1×4 AWG is used for the wavelength multi/demultiplexer that performs the wavelength multiplexing and demultiplexing simultaneously.

FIG. 2 is a table showing a periodic wavelength demultiplexing property in input/output combination of the 4×4 AWG and a port connection rule between the transmitting and receiving apparatuses and the 4×4 AWG in this embodiment of the present invention. The wavelength demultiplexing property of the 4×4 AWG has the same periodicity as that of the prior art. Although the connection relation between the transmitting and receiving apparatuses and the first I/O port group of the 4×4 AWG is also the same as that of the prior art the connection relation between the transmitting and receiving apparatus and the second I/O port group of the 4×4 AWG is different from that of the prior art. Furthermore, unlike the prior art according to combinations of the 4×4 AWG ports and the wavelengths of the optical signals, some optical signals are input from the first I/O port group side and output to the second I/O port group side, and other optical signals are input from the second I/O port group side and output to the first I/O port group side. Thus optical signals input/output bidirectionally.

Figure 3:
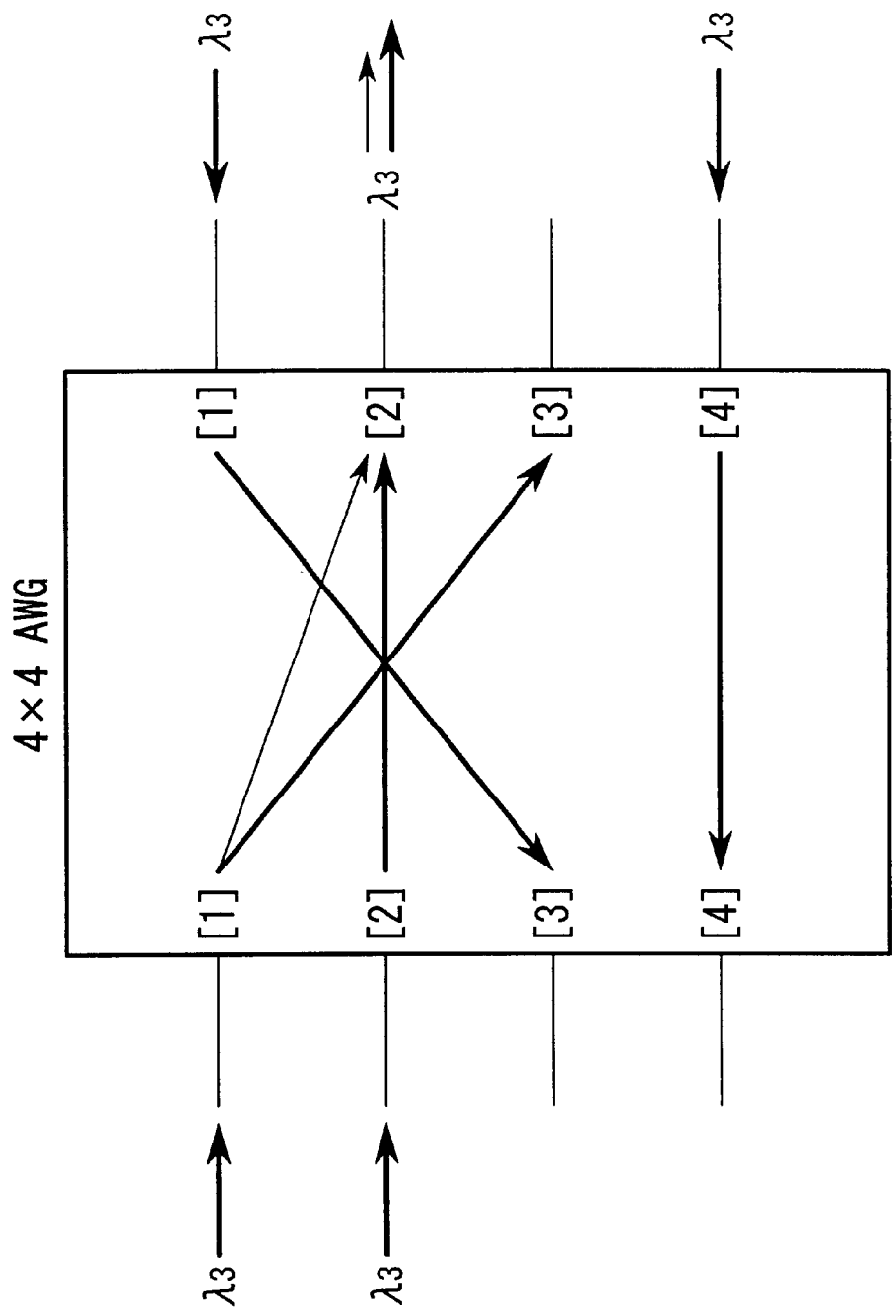
FIG. 3 is a diagram for explaining coherent crosstalk light of the first embodiment of the present invention.

In this embodiment, two optical signals among the four optical signals having the equal wavelength are input from the first I/O port group side to the 4×4 AWG, and other two optical signals are input from the second I/O port group side thereto. Since the lightwaves which are traveling in opposite directions are independent from each other, the optical wave input from the first I/O port group side and the optical wave input from the second I/O port group side, which have the equal wavelength, never interfere with each other within the 4×4 AWG. Accordingly, the WDM wavelength light output from the port of the 4×4 AWG includes only one optical signal and one coherent crosstalk light. For example, as shown in FIG. 3, the light having the wavelength $\lambda_3$, which is output from the port 2 of the second I/O port group, includes only the optical signal $\lambda_3$ (thick solid line) input from the port 2 of the first I/O port group and the crosstalk light (thin solid line) of the optical signal $\lambda_3$ input from the port 1 of the first I/O port group, and does not include the crosstalk lights of the optical signals $\lambda_3$ input from the ports 1 and 4 of the second I/O port group. Specifically, the accumulation number of the coherent crosswalk lights is reduced to one from three, which is the accumulation number in the prior art.

In this embodiment, since the two optical signals having the equal wavelength, which are input from the first I/O port group side, are input from the ports adjacent to each other and the optical signals input from the second I/O port group side are input from the ports cyclically adjacent to each other, one coherent crosstalk light included in the output WDM wavelength light from the 4×4 AWG is a crosstalk light contributed from an adjacent port. Accordingly, in the full-mesh WDM transmission network device of this embodiment S/N of the WDM wavelength light received is expressed as follows:

$$S/N = P_{Signal}/P_{AdjCT} \qquad (2)$$

S/N is equal to 30 dB when $P_{Signal}/P_{AdjCT}$ is assumed to be −30 dB, and the S/N is improved by 3 dB compared to 27 dB in the prior art.

Figure 4:
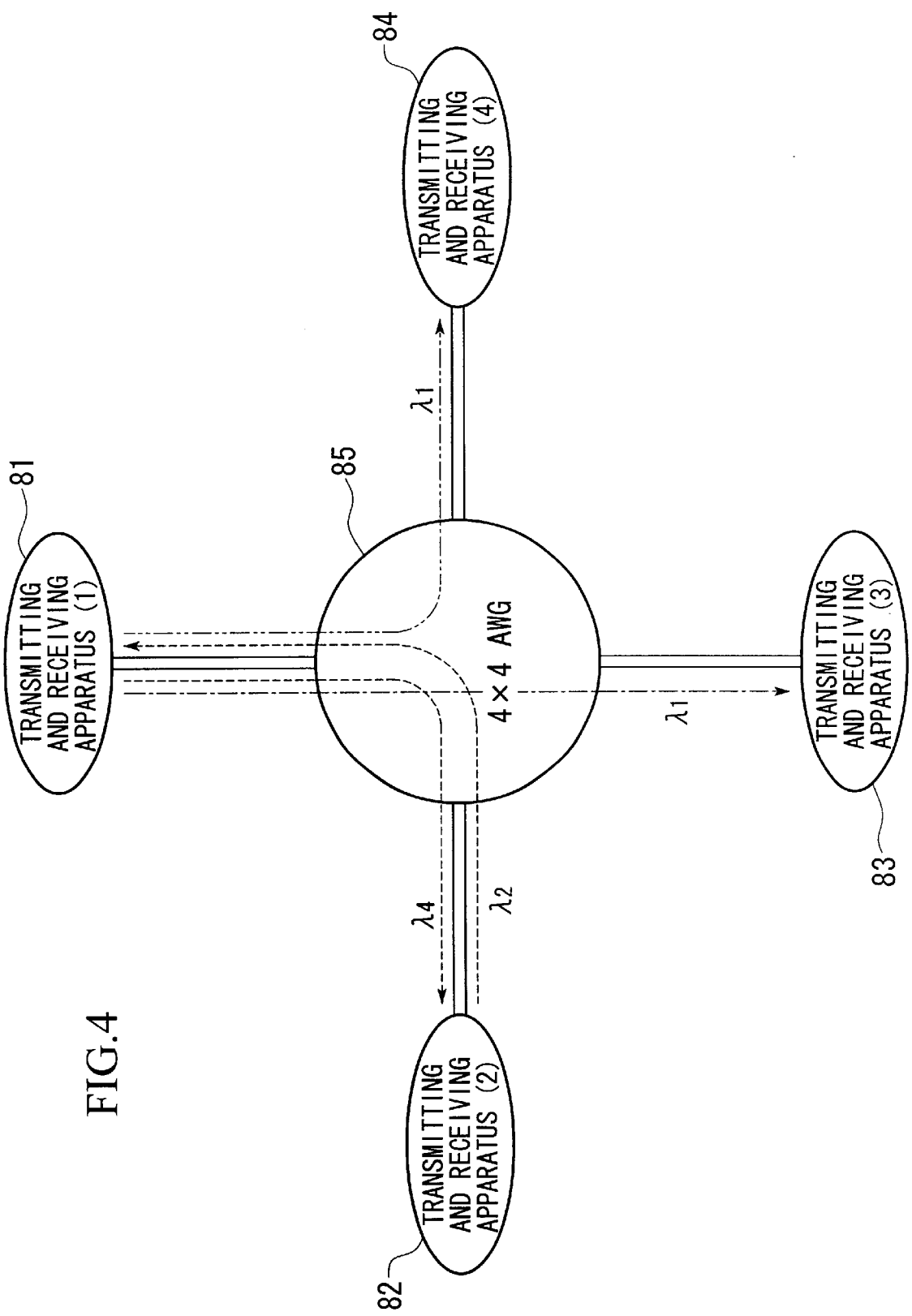
FIG. 4 is a diagram for explaining a wavelength addressing of the first embodiment of the present invention.

FIG. 4 is a diagram for explaining wavelength addressing in this embodiment. In FIG. 4, reference numerals 81 to 84 denote four transmitting and receiving apparatuses, and reference numeral 85 denotes a 4×4 AWG. The wavelength demultiplexing property of the 4×4 AWG 85 and the connection relation between the transmitting and receiving apparatuses and the 4×4 AWG 85 are explained in FIG. 2. For example, the optical signal having the wavelength $\lambda_4$, transmitted from the transmitting and receiving apparatus (1) 81, is guided to the port 3 of the second I/O port group in the 4×4 AWG 85, and switched within the 4×4 AWG 85. This optical signal is then sent to the transmitting and receiving apparatus (2) 82 from the port 2 of the first I/O port group. Similarly, the return signal $\lambda_2$ returned from the transmitting and receiving apparatus (2) 82 is guided to the port 2 of the second I/O port group in the 4×4 AWG 85, and then sent to the transmitting and receiving apparatus (1) 81 from the port 1 of the first I/O port group.

Furthermore, one of the two optical signals having the wavelength $\lambda_1$ returned from the transmitting and receiving apparatus (1) 81 is guided to the port 3 of the second I/O port group in the 4×4 AWG 85, and automatically delivered to the transmitting and receiving apparatus (3) 83 from the port 3 of the first I/O port group. The other is guided to the port 1 of the first I/O port group in the 4×4 AWG 85, and automatically delivered to the transmitting and receiving apparatus (4) 84 from the port 1 of the second I/O port group. These two optical signals are transmitted from the transmitters 45 and 46 of the transmitting and receiving apparatus (1) 41 in FIG. 1.

As described above, the full-mesh WDM transmission network device in this embodiment uses the constituent components similar to those of the prior art, and keeps the similar wavelength addressing function, while reducing the accumulation number of the coherent crosstalk lights included in each WDM wavelength light to one from three, thus realizing higher quality communication. Specifically, the S/N of the received light is improved by 3 dB.

Note that the table shown in FIG. 2 is strictly an example, and other examples applicable to this embodiment exist. The way to prepare such tables will be explained below (1) Connection of the First I/O Port The port 1 of the first I/O port group is connected to the transmitting and receiving apparatus (1), and the port 2 is connected to the transmitting and receiving apparatus (2). The port 3 is connected to the transmitting and receiving apparatus (3), and the port 4 is connected to the transmitting and receiving apparatus (4).

(2) Determination of Directions of the Optical Signals

Direction of the optical signal in each column of the table (direction of the arrow) will be any one of the following cases 1 to 4:

Case 1. . . . The following optical signals will be directed to the right, and the remaining will be directed to the left.

the optical signal between the port 1 of the first I/O port group and the port 1 of the second I/O port group the optical signal between the port 1 of the first I/O port group and the port 3 of the second I/O port group the optical signal between the port 4 of the first I/O port group and the port 1 of the second I/O port group the optical signal between the port 4 of the first I/O port group and the port 3 of the second I/O port group the optical signal between the port 2 of the first I/O port group and the port 2 of the second I/O port group the optical signal between the port 2 of the first I/O port group and the port 4 of the second I/O port group the optical signal between the port 3 of the first I/O port group and the port 2 of the second I/O port group the optical signal between the port 3 of the first I/O port group and the port 4 of the second I/O port group Case 2. . . . The following optical signals will be directed to the right and the remaining will be directed to the left.

the optical signal between the port 2 of the first I/O port group and the port 1 of the second I/O port group the optical signal between the port 2 of the first I/O port group and the port 3 of the second I/O port group the optical signal between the port 3 of the first I/O port group and the port 1 of the second I/O port group the optical signal between the port 3 of the first I/O port group and the port 3 of the second I/O port group the optical signal between the port 1 of the first I/O port group and the port 2 of the second I/O port group the optical signal between the port 1 of the first I/O port group and the port 4 of the second I/O port group the optical signal between the port 4 of the first I/O port group and the port 2 of the second I/O port group the optical signal between the port 4 of the first I/O port group and the port 4 of the second I/O port group Case 3. . . . The following optical signals will be directed to the right, and the remaining will be directed to the left.

the optical signal between the port 1 of the first I/O port group and the port 1 of the second I/O port group the optical signal between the port 1 of the first I/O port group and the port 3 of the second I/O port group the optical signal between the port 2 of the first I/O port group and the port 1 of the second I/O port group the optical signal between the port 2 of the first I/O port group and the port 3 of the second I/O port group the optical signal between the port 3 of the first I/O port group and the port 2 of the second I/O port group the optical signal between the port 3 of the first I/O port group and the port 4 of the second I/O port group the optical signal between the port 4 of the first I/O port group and the port 2 of the second I/O port group the optical signal between the port 4 of the first I/O port group and the port 4 of the second I/O port group Case 4. . . . The following optical signals will be directed to the right, and the remaining will be directed to the left.

the optical signal between the port 3 of the first I/O port group and the port 1 of the second I/O port group the optical signal between the port 3 of the first I/O port group and the port 3 of the second I/O port group the optical signal between the port 4 of the first I/O port group and the port 1 of the second I/O port group the optical signal between the port 4 of the first I/O port group and the port 3 of the second I/O port group the optical signal between the port 1 of the first I/O port group and the port 2 of the second I/O port group the optical signal between the port 1 of the first I/O port group and the port 4 of the second I/O port group the optical signal between the port 2 of the first I/O port group and the port 2 of the second I/O port group the optical signal between the port 2 of the first I/O port group and the port 4 of the second I/O I/O port group (3) Connection of the Second I/O Port Group In accordance with the direction of the optical signal, that is, the cases 1 to 4, each port of the second I/O port group and the transmitting and receiving apparatuses (1) to (4) are connected as follows:

For the cases 1 and 2. . . . The ports of the second I/O port group and the transmitting and receiving apparatuses (1) to (4) are connected in any one of the following manners:

The port 1 of the second I/O port group is connected to the transmitting and receiving apparatus (1), and the port 2 is connected to the transmitting and receiving apparatus (2). The port 3 is connected to the transmitting and receiving apparatus (4) and the port 4 is connected to the transmitting and receiving apparatus (3).

The port 1 of the second I/O port group is connected to the transmitting and receiving apparatus (4), and the port 2 is connected to the transmitting and receiving apparatus (2). The port 3 is connected to the transmitting and receiving apparatus (1) and the port 4 is connected to the transmitting and receiving apparatus (3).

The port 1 of the second I/O port group is connected to the transmitting and receiving apparatus (1), and the port 2 is connected to the transmitting and receiving apparatus (3). The port 3 is connected to the transmitting and receiving apparatus (4) and the port 4 is connected to the transmitting and receiving apparatus (2).

The port 1 of the second I/O port group is connected to the transmitting and receiving apparatus (4), and the port 2 is connected to the transmitting and receiving apparatus (3). The port 3 is connected to the transmitting and receiving apparatus (1) and the port 4 is connected to the transmitting and receiving apparatus (2).

The port 1 of the second I/O port group is connected to the transmitting and receiving apparatus (2), and the port 2 is connected to the transmitting and receiving apparatus (1). The port 3 is connected to the transmitting and receiving apparatus (3) and the port 4 is connected to the transmitting and receiving apparatus (4).

The port 1 of the second I/O port group is connected to the transmitting and receiving apparatus (3), and the port 2 is connected to the transmitting and receiving apparatus (1). The port 3 is connected to the transmitting and receiving apparatus (2) and the port 4 is connected to the transmitting and receiving apparatus (4).

The port 1 of the second I/O port group is connected to the transmitting and receiving apparatus (2), and the port 2 is connected to the transmitting and receiving apparatus (4). The port 3 is connected to the transmitting and receiving apparatus (3) and the port 4 is connected to the transmitting and receiving apparatus (1).

The port 1 of the second I/O port group is connected to the transmitting and receiving apparatus (3), and the port 2 is connected to the transmitting and receiving apparatus (4). The port 3 is connected to the transmitting and receiving apparatus (2) and the port 4 is connected to the transmitting and receiving apparatus (1).

For the cases 3 and 4. . . . Connection is made in any one of the following manners:

The port 1 of the second I/O port group is connected to the transmitting and receiving apparatus (1), and the port 2 is connected to the transmitting and receiving apparatus (3). The port 3 is connected to the transmitting and receiving apparatus (2) and the port 4 is connected to the transmitting and receiving apparatus (4).

The port 1 of the second I/O pot group is connected to the transmitting and receiving apparatus (2), and the port 2 is connected to the transmitting and receiving apparatus (3). The port 3 is connected to the transmitting and receiving apparatus (1) and the port 4 is connected to the transmitting and receiving apparatus (4).

The port 1 of the second I/O port group is connected to the transmitting and receiving apparatus (1), and the port 2 is connected to the transmitting and receiving apparatus (4). The port 3 is connected to the transmitting and receiving apparatus (2) and the port 4 is connected to the transmitting and receiving apparatus (3).

The port 1 of the second I/O port group is connected to the transmitting and receiving apparatus (2), and the port 2 is connected to the transmitting and receiving apparatus (4). The port 3 is connected to the transmitting and receiving apparatus (1) and the port 4 is connected to the transmitting and receiving apparatus (3).

The port 1 of the second I/O port group is connected to the transmitting and receiving apparatus (3), and the port 2 is connected to the transmitting and receiving apparatus (1). The port 3 is connected to the transmitting and receiving apparatus (4) and the port 4 is connected to the transmitting and receiving apparatus (2).

The port 1 of the second I/O port group is connected to the transmitting and receiving apparatus (4), and the port 2 is connected to the transmitting and receiving apparatus (1). The port 3 is connected to the transmitting and receiving apparatus (3) and the port 4 is connected to the transmitting and receiving apparatus (2).

The port 1 of the second I/O port group is connected to the transmitting and receiving apparatus (3), and the port 2 is connected to the transmitting and receiving apparatus (2). The port 3 is connected to the transmitting and receiving apparatus (4) and the port 4 is connected to the transmitting and receiving apparatus (1).

The port 1 of the second I/O port group is connected to the transmitting and receiving apparatus (4), and the port 2 is connected to the transmitting and receiving apparatus (2). The port 3 is connected to the transmitting and receiving apparatus (3) and the port 4 is connected to the transmitting and receiving apparatus (1).

The table is completed by the above-described manners (1) to (3). The table completed in such ways satisfies the following conditions ① to ⑤. Note that in this embodiment N is four.

① The ports 1 to N of the first I/O port group are connected to different transmitting and receiving apparatuses among the transmitting and receiving apparatuses (1) to (N), respectively. Moreover, the ports 1 to N of the second I/O port group are connected to different transmitting and receiving apparatuses among the transmitting and receiving apparatuses (1) to (N), respectively.

② The input/output combinations between the first and second I/O port groups have the periodic wavelength demultiplexing property. To be more specific, each of N optical signals, which has a different wavelength from the others, is transmitted at each of N paths between any one of the ports of the first I/O port group and N ports of the second I/O port group. Moreover, each of N optical signals, which has a different wavelength from the others, is transmitted at each of N paths between any one of the ports of the second I/O port group and N ports of the first I/O port group. As a result, among N×N port combinations made by the N ports of the first I/O port group and the N ports of the second I/O port group, there are N port combinations for each wavelength, through which optical signals having the same wavelength are transmitted.

③ Among the N port combinations made by any one of the ports of the first I/0 port group and each port of the second I/O port group, the optical signals are transmitted from the first I/O port group to the second I/O port group through the N/2 port combinations, and the optical signals are transmitted from the second I/O port group to the first I/O port group through the remaining port combinations.

④ Among the N port combinations through which optical signals having an equal wavelength are transmitted, the optical signals are transmitted from the first I/O port group to the second I/O port group through the N/2 port combinations, and the optical signals are transmitted from the second I/O port group to the first I/O port group through the remaining port combinations.

⑤ The ports of the second I/O port group to which the optical signals are transmitted from the ports of the first I/O port group connected to any one of the transmitting and receiving apparatuses and the ports of the first I/O port group to which the optical signals are transmitted from the ports of the second I/O port group connected to this transmitting and receiving apparatus are respectively connected to different transmitting and receiving apparatuses.

In the above described conditions ① to ⑤, the number of the port combinations through which the optical signals are transmitted from the first I/O port group to the second I/O port group are made to be equal to that of the port combinations through which the optical signals are transmitted from the second I/O port group to the first I/O port group, that is, N/2. However, both numbers need not to be equal necessarily. Note that if both numbers are made to be equal, the best communication quality can be achieved.

Embodiment 2

Figure 5:
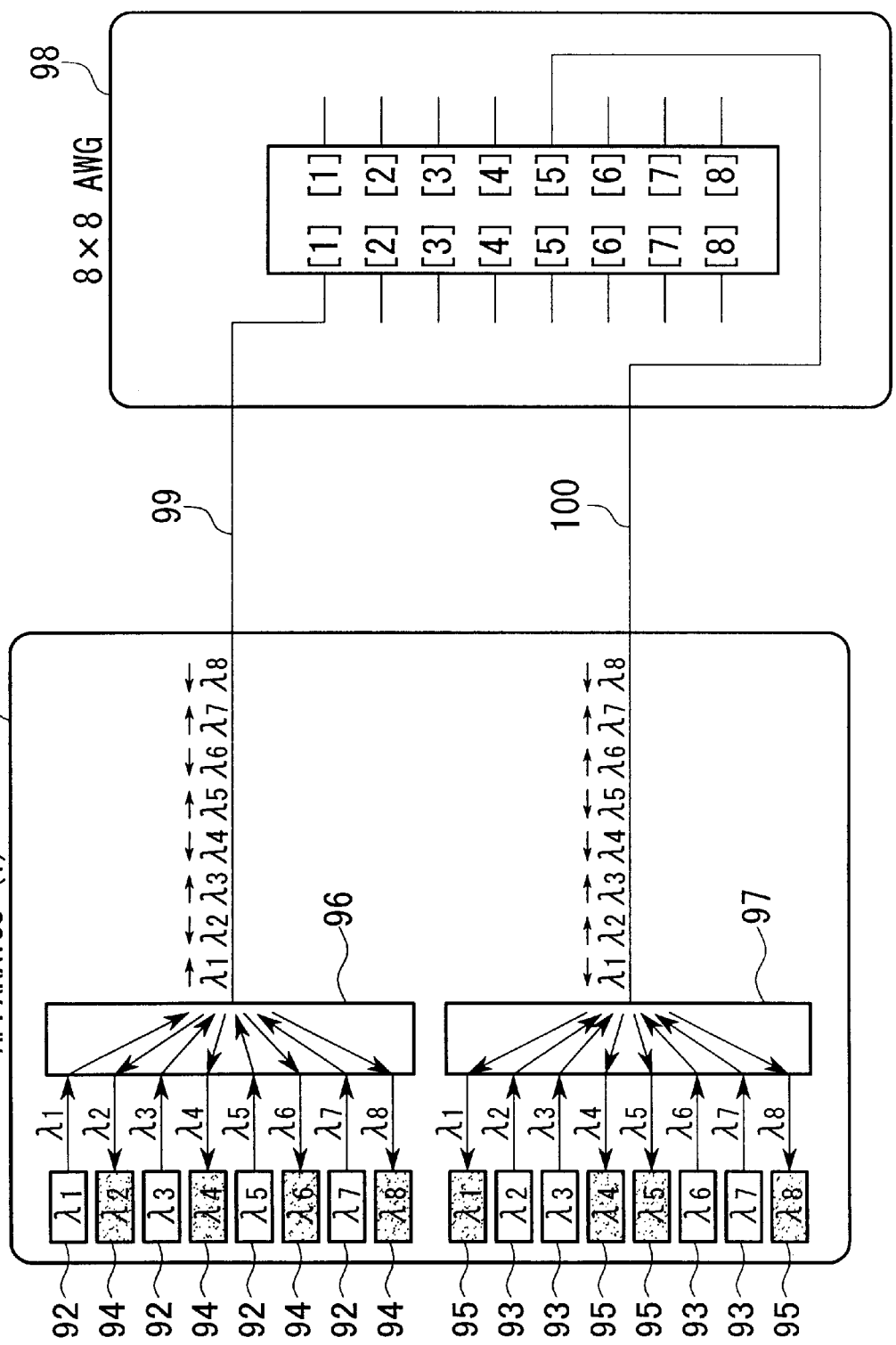
FIG. 5 is a block diagram for explaining a schematic constitution of a second embodiment of the present invention.

FIG. 5 is a block diagram for explaining a second embodiment of the present invention, which shows a schematic constitution of the full-mesh WDM transmission network device in which the number N is increased to eight from four in the first embodiment. In FIG. 5, reference numerals 91 denotes a transmitting and receiving apparatus; 92 and 93, transmitters for transmitting a WDM signal (wavelength $\lambda_K$:

K=1 to 8); 94 and 95, receivers for receiving the WDM signal (wavelength $\lambda_K$: K=1 to 8); 96 and 97, 1×8 wavelength multi/demultiplexes for multiplexing four optical signals having different wavelengths onto one optical fiber and demultiplexing a WDM signal wavelength-multiplexed onto one optical fiber, into four optical signals; 98, an 8×8 wavelength multi/demultiplexer having a first I/O port group (ports 1 to 8 on the left side) composed of eight ports and a second I/O port group (ports 1 to 8 on the right side) composed of eight ports, the 8×8 wavelength multi/demultiplexer showing a periodic wavelength demultiplexing property in input/output combination, and 99 and 100, optical fibers for optically connecting the transmitting and receiving apparatus 91 and the I/O ports of the 8×8 wavelength multi/demultiplexer 98. Although the 8×8 wavelength multi/demultiplexer 98 is connected to the eight transmitting and receiving apparatuses, illustrations for the seven transmitting and receiving apparatuses other than the transmitting and receiving apparatus (1) 91 are omitted. In FIG. 5, the wavelength (wavelength $\lambda_K$: K=1 to 8) of the WDM signals transmitted through the optical fibers 99 and 100, the WDM signals being wavelength-multiplexed, and the transmission directions of the WDM signals, indicated by the arrow, are illustrated.

In this embodiment, a 1×8 AWG was used as the 1×8 wavelength multi/demultiplexes 96 and 97, and an 8×8 AWG having a periodic wavelength demultiplexing property in input/output combination was used as the 8×8 wavelength multi/demultiplexer 98. Constituent components including the transmitter, the receiver, the 1×8 AWG, the 8×8 AWG and the optical fiber, which constitute the full-mesh WDM transmission network device of this embodiment, are identical to those of the prior art. Although the 1×8 AWG was conventionally used exclusively for the wavelength multiplexer or the wavelength demultiplexing circuit, this embodiment of the present invention uses the 1×8 AWG for the wavelength multi/demultiplexer that performs the wavelength multiplexing and demultiplexing simultaneously, similarly to the first embodiment.

FIG. 6 is a table showing a periodic wavelength demultiplexing property in input/output combination of the 8×8 AWG and a port connection rule between the transmitting and receiving apparatuses and the 8×8 AWG in this embodiment of the present invention. Although the wavelength demultiplexing property of the 8×8 AWG is the same as that of the prior art, the connection relation between the transmitting and receiving apparatuses and the second I/O port group of the 8×8 AWG is different from that of the prior art similarly to the first embodiment. Moreover, the 8×8 AWG performs bi-directional input/output for the optical signals.

Figure 7:
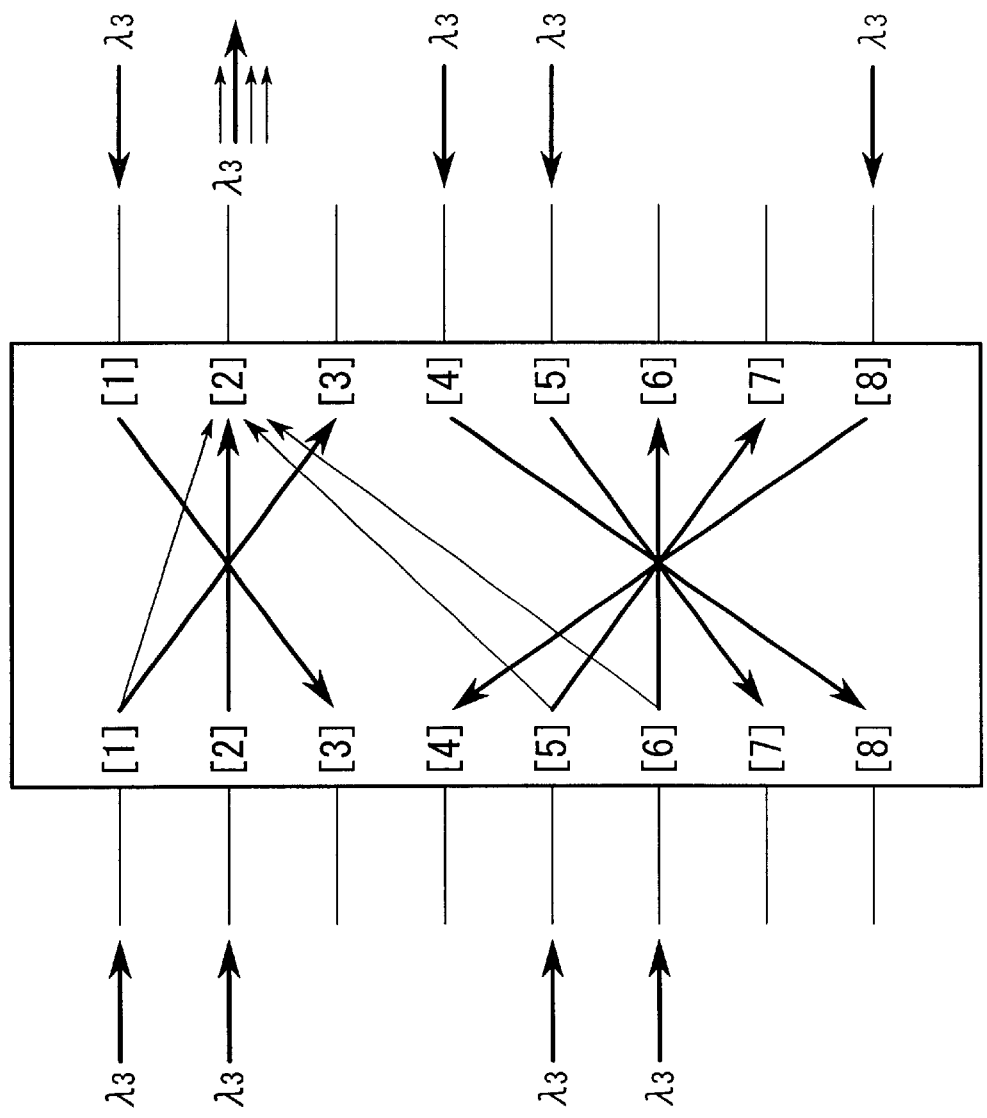
FIG. 7 is a diagram for explaining coherent crosstalk light of the second embodiment of the present invention.

In this embodiment, the four optical signals among the eight optical signals having the equal wavelength are input from the first I/O port group side to the 8×8 AWG, and other four optical signals are input from the second I/O port group side thereto. Since lightwaves which are traveling in opposite directions are independent from each other, a predetermined WDM wavelength light output from the port of the AWG includes only one optical signal and three coherent crosstalk lights. For example, as shown in FIG. 7, the light having the wavelength $\lambda_3$, which is output from the port 2 of the second I/O port group, includes only the optical signal $\lambda_3$ (thick solid line) input from the port 2 of the first I/O port group and the crosswalk lights (thin solid line) of the optical signals $\lambda_3$ input from the ports 1, 5 and 6 of the first I/O port group, and does not include the crosswalk lights of the optical signals $\lambda_3$ input from the ports 1, 4, 5 and 8 of the second I/O port group. Specifically, the accumulation number of the coherent crosstalk lights is reduced to three from seven that is the accumulation number in the prior art.

In this embodiment, since the four optical signals having the equal wavelength, which are input from the first I/O port group side, are input from the ports 1, 2, 5 and 6 or the ports 3, 4, 7 and 8 and the four optical signals having the equal wavelength, which are input from the second I/O port group side, are input from the ports 1, 4, 5 and 8 or the ports 2, 3, 6 and 7, respectively, three coherent crosstalk lights included in the output WDM wavelength light are one adjacent crosstalk light and two non-adjacent crosstalk lights. Accordingly, in the full-mesh WDM transmission network device of this embodiment, the S/N of the WDM wavelength light received is expressed as follows.

$$S/N = P_{Signal}/[P_{AdjCT} + 2P_{OthCT}] \quad (3)$$

The S/N is equal to 29 dB when $P_{AdjCT}/P_{Signal}$ is assumed to be −30 dB and $P_{OthCT}/P_{Signal}$ is assumed to be −40 dB, respectively, and the S/N is improved by 3 dB compared to 26 dB in the prior art.

Figure 8:
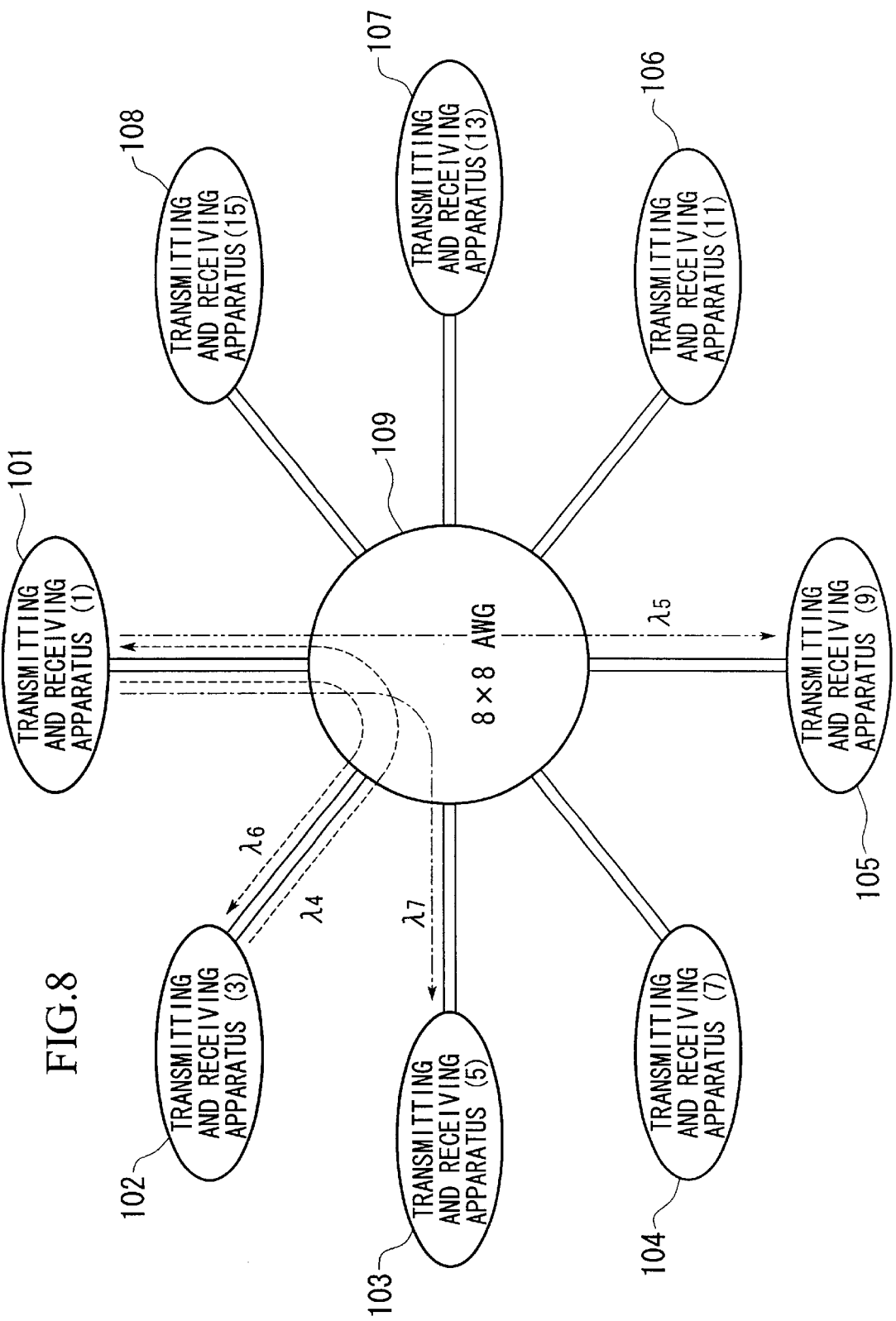
FIG. 8 is a diagram for explaining a wavelength addressing of the second embodiment of the present invention.

FIG. 8 is a diagram for explaining wavelength addressing in this embodiment. In FIG. 8, reference numerals 101 to 108 denote eight transmitting and receiving apparatuses, and reference numeral 109 denotes an 8×8 AWG. The wavelength demultiplexing property of the 8×8 AWG and the connection relation between the transmitting and receiving apparatuses and the 8×8 AWG are explained in FIG. 6. For example, the optical signal having the wavelength $\lambda_6$, transmitted from the transmitting and receiving apparatus (1) 101, is guided to the port 5 of the second I/O port group in the 8×8 AWG, and switched within the 8×8 AWG 109. This optical signal is then sent to the transmitting and receiving apparatus (2) 102 from the port 2 of the first I/O port group. Similarly, the return signal $\lambda_4$ transmitted from the transmitting and receiving apparatus (2) 102 is guided to the port 4 of the second I/O port group in the 8×8 AWG 109, and then sent to the transmitting and receiving apparatus (1) 101 from the port 1 of the first I/O port group. Moreover, the optical signals having the wavelengths $\lambda_5$ and $\lambda_7$, transmitted from the transmitting and receiving apparatus (1) 101, for example, are automatically delivered to the transmitting and receiving apparatus (5) 105 and the transmitting and receiving apparatus (3) 103, respectively.

As described above, the full-mesh WDM transmission network device in this embodiment uses the constituent components similar to those of the prior art, and keeps the similar wavelength addressing function, while reducing the accumulation number of the coherent crosstalk lights included in each WDM wavelength light to three from seven, thus realizing higher quality communication. Specifically, the S/N of the received light is improved by 3 dB.

Embodiment 3

Figure 9:
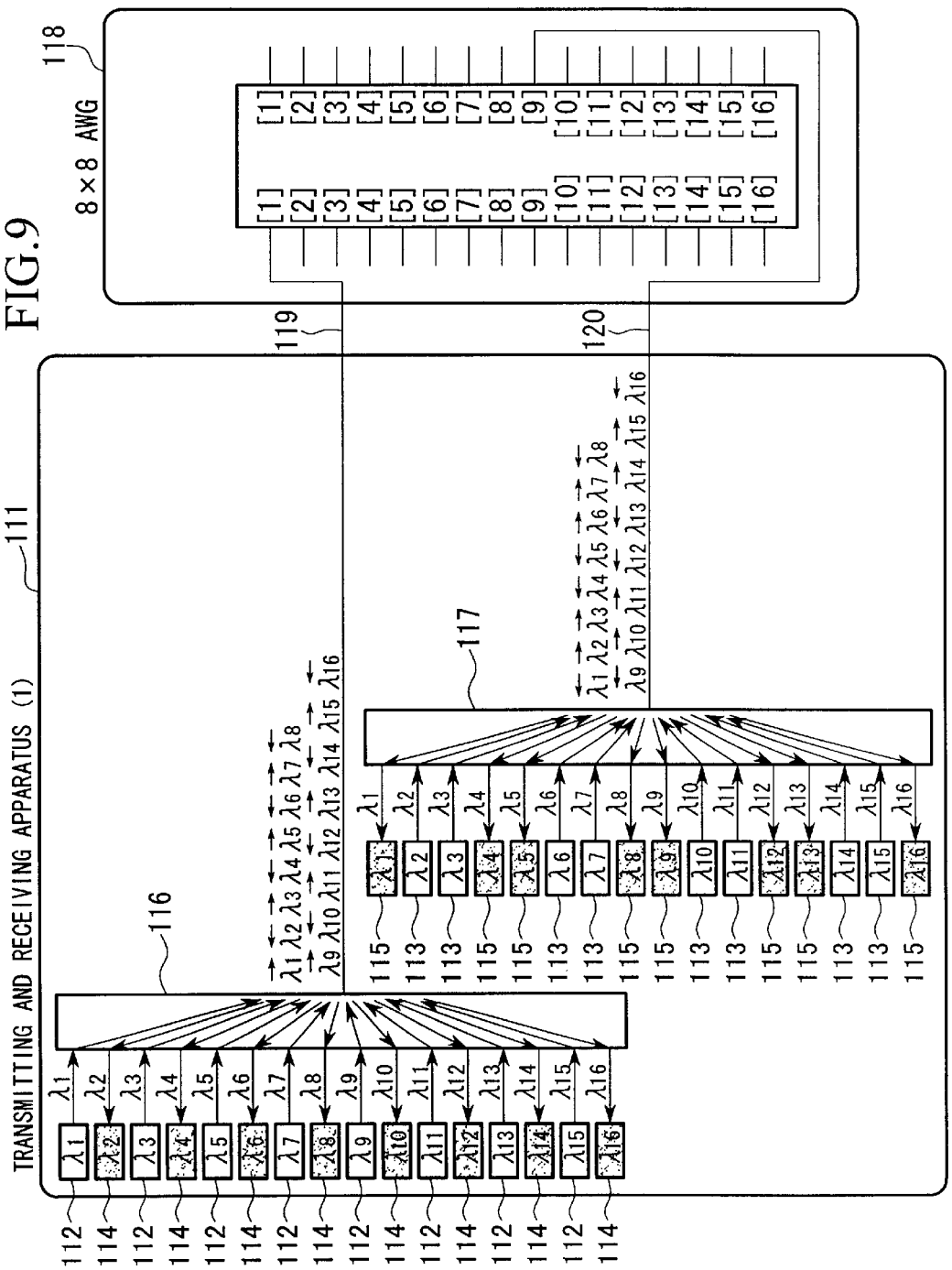
FIG. 9 is a block diagram for explaining a schematic constitution of a third embodiment of the present invention.

FIG. 9 is a block diagram for explaining a third embodiment of the present invention, which shows a schematic constitution of the full-mesh WDM transmission network device in which the number N is increased to 16 compared to the first and the second embodiments. In FIG. 9, reference numeral 111 denotes a transmitting and receiving apparatus; 112 and 113, transmitters for transmitting a WDM signal (wavelength $\lambda_K$: K=1 to 16); 114 and 115, receivers for receiving the WDM signal (wavelength $\lambda_K$: K=1 to 16); 116 and 117, 1×16 wavelength multi/demultiplexes for multiplexing eight optical signals having different wavelengths onto one optical fiber and demultiplexing a WDM signal wavelength-multiplexed onto one optical fiber, into eight optical signals; 118, a 16×16 wavelength multi/demultiplexer having a first I/O port group (ports 1 to 16 on the left side) composed of sixteen ports and a second I/O port group (ports 1 to 16 on the right side) composed of sixteen ports, the 16×16 wavelength multi/demultiplexer showing a periodic wavelength demultiplexing property in input/output combination; and 119 and 120, optical fibers for optically connecting the transmitting and receiving apparatus 111 and the I/O ports of the 16×16 wavelength multi/demultiplexer 118. Although the 16×16 wavelength multi/demultiplexer 118 is connected to the sixteen transmitting and receiving apparatuses, illustrations for the fifteen transmitting and receiving apparatuses other than the transmitting and receiving apparatus (1) 111 are omitted. In FIG. 9, illustrated are the wavelength $\lambda_K$: K=1 to 16) of the WDM signals transmitted through the optical fibers 119 and 120, the WDM signals being wavelength-multiplexed, and the transmission directions of the WDM signals, indicated by the arrow.

In this embodiment, a 1×16 AWG was used as the 1×16 wavelength multi/demultiplexes 116 and 117, and a 16×16 AWG having a periodic wavelength demultiplexing property in input/output combination was used as the 16×16 wavelength multi/demultiplexer 118. Constituent components including the transmitter the receiver, the 1×16 AWG, the 16×16 AWG and the optical fiber, which constitute the full-mesh WDM transmission network device of this embodiment, are identical to those of the prior art. Although the 1×16AWG was conventionally used exclusively for the wavelength multiplexer or the wavelength demultiplexing circuit, this embodiment of the present invention uses the 1×16 AWG for the wavelength multi/demultiplexer that performs the wavelength multiplexing and demultiplexing simultaneously, similarly to the first and second embodiments.

FIG. 10 is a table showing a periodic wavelength demultiplexing property in input/output combination of the 16×16 AWG and a port connection rule between the transmitting and receiving apparatuses and the 16×16 AWG in this embodiment of the present invention. Although the wavelength demultiplexing property of the 16×16 AWG is the same as that of the prior art, the port connection rule between the transmitting and receiving apparatuses and the second I/O port group of the 16×16 AWG is different from that of the prior art, similarly to the first and second embodiments. Moreover, the 16×16 AWG performs bi-directional input/output for the optical signals.

Figure 11:
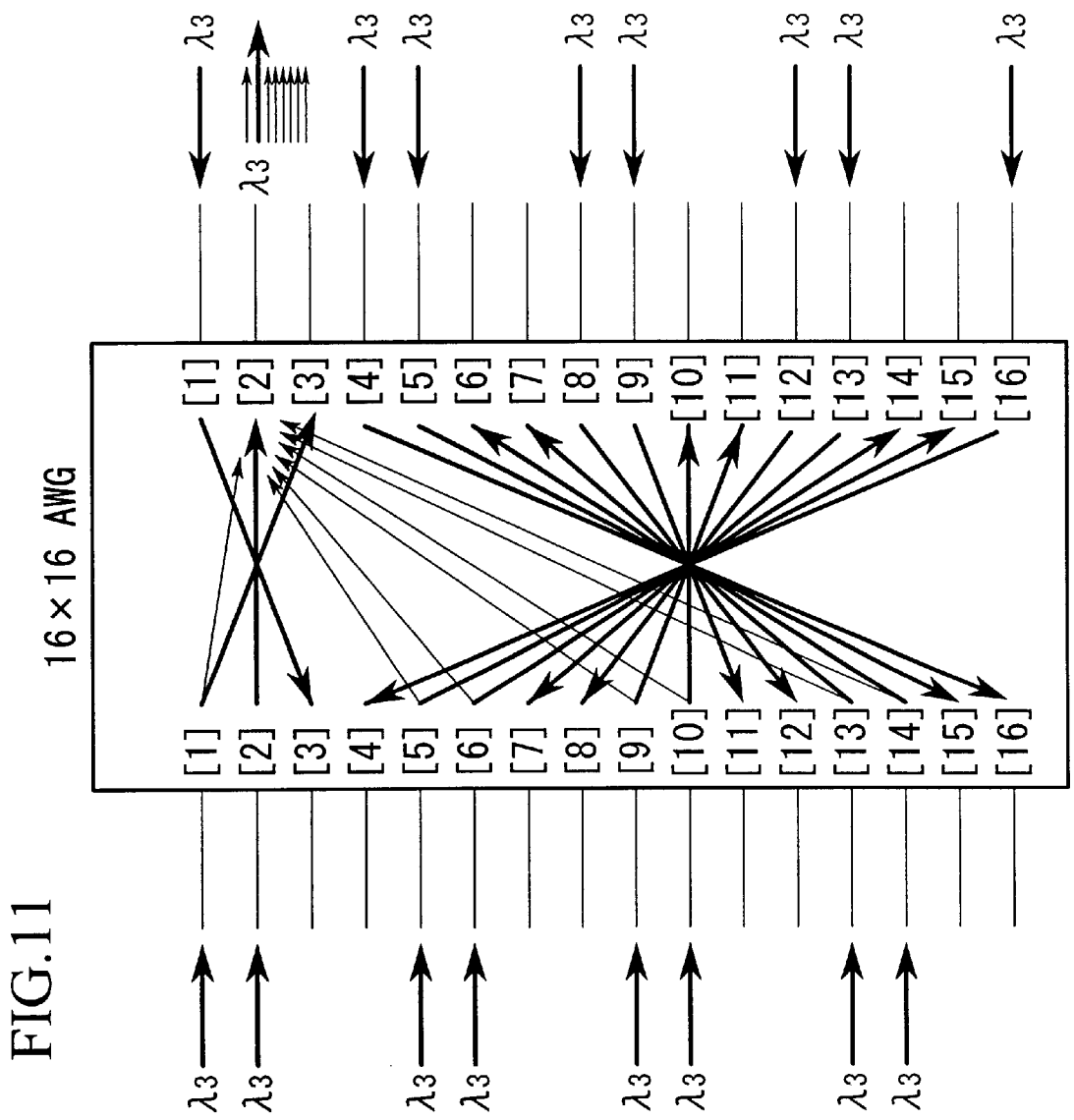
FIG. 11 is a diagram for explaining coherent crosstalk light of the third embodiment of the present invention.

In this embodiment, the eight optical signals among the sixteen optical signals having the equal wavelength are input from the first I/O port group side to the 16×16 AWG, and other eight optical signals are input from the second I/O port group side thereto. Since lightwaves which are traveling in opposite directions are independent from each other, a predestined WDM wavelength light output from the port of the AWG includes only one optical signal and seven coherent crosstalk lights. For example, as shown in FIG. 11, the light having the wavelength $\lambda_3$, which is output from the port 2 of the second I/O port group, includes only the optical signal $\lambda_3$ (thick solid line) input from the port 2 of the first I/O port group and the crosstalk lights (thin solid line) of the optical signals 3 input from the ports 1, 5, 6, 9, 10, 13, and 14 of the first I/O port group, and does not include the crosstalk lights of the optical signal 13 input from the ports 1, 4, 5, 8, 9, 12, 13, and 16 of the second I/O port group. Specifically, the accumulation number of the coherent crosstalk lights is reduced to seven from fifteen that is the accumulation number in the prior art.

In this embodiment since the eight optical signals having the equal wavelength, which are input from the first I/O port group side, are input from the ports 1, 2, 5, 6, 9, 10, 13, and 14 or the ports 3, 4, 7, 8, 11, 12, 15, and 16 and the eight optical signals having the equal wavelength, which are input from the second I/O port group side, are input from the ports 1, 4, 5, 8, 9, 12, 13, and 16 or the ports 2, 3, 6, 7, 10, 11, 14, and 15, seven coherent crosstalk lights included in the output WDM wavelength light are one adjacent crosstalk light and six non-adjacent crosstalk lights. Accordingly, in the full-mesh WDM transmission network device of this embodiment, the S/N of the WDM wavelength light received is expressed as follows:

$$S/N = P_{Signal}/[P_{AdjCT} + 6P_{OthCT}] \qquad (4)$$

The S/N is equal to 28 dB when $P_{AdjCT}/P_{Signal}$ is assumed to be −30 dB and $P_{OthCT}/P_{Signal}$ is assumed to be −40 dB, respectively, and the S/N is improved by 3 dB compared to 25 dB in the prior art.

Figure 12:
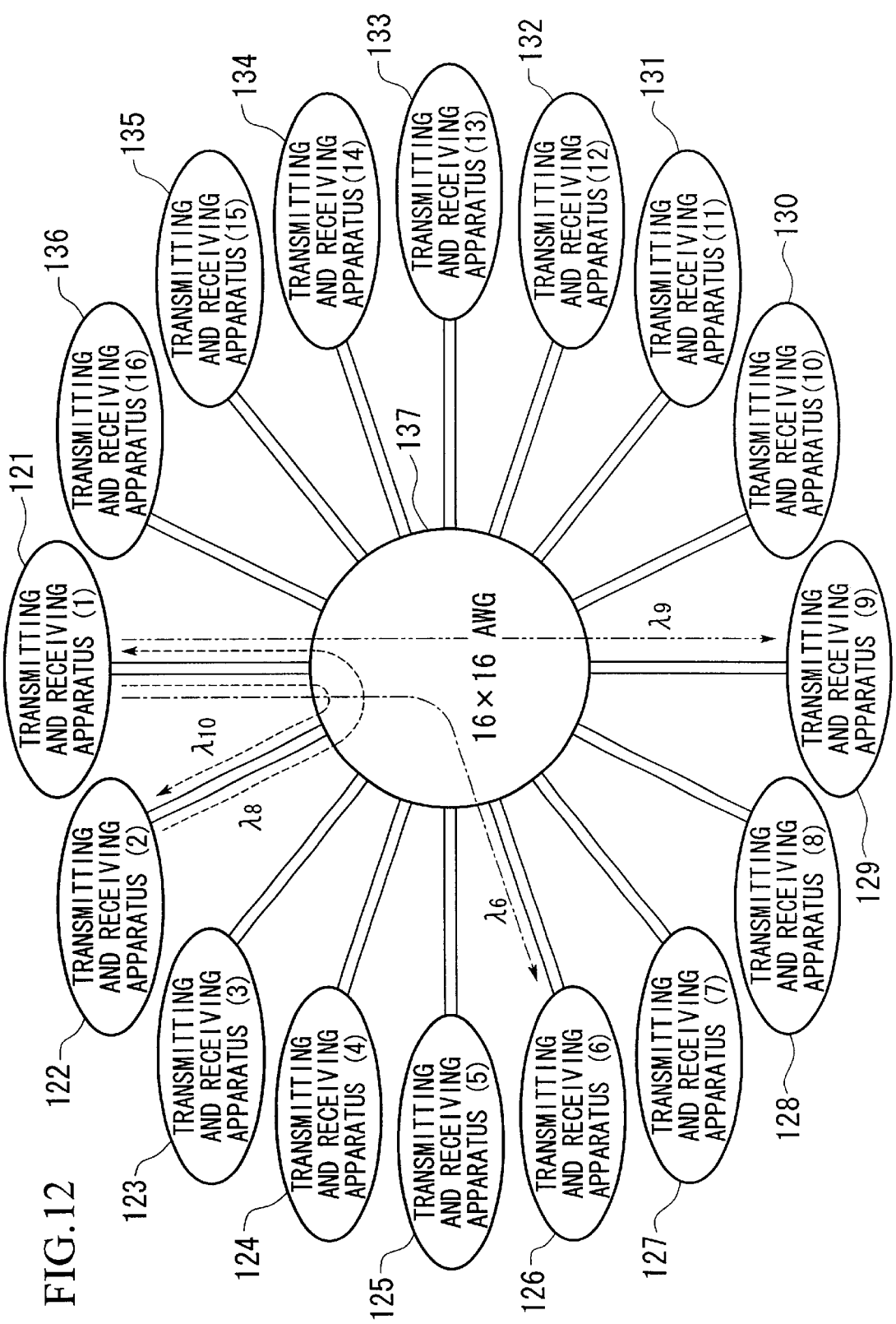
FIG. 12 is a diagram for explaining a wavelength addressing of the third embodiment of the present invention.

FIG. 12 is a diagram for explaining wavelength addressing in this embodiment. In FIG. 12, reference numerals 121 to 136 denote sixteen transmitting and receiving apparatuses, and reference numeral 137 denotes a 16×16 AWG. The wavelength demultiplexing property of the 16×16 AWG and the connection relation between the transmitting and receiving apparatuses and the 16×16 AWG are explained in FIG. 10. For example, the optical signal having the wavelength $\lambda_{10}$, transmitted from the transmitting and receiving apparatus (1) 121, is guided to the port 9 of the second I/O port group in the 16×16AWG 137, and switched within the 16×16 AWG 137. This optical signal is then sent to the transmitting and receiving apparatus (2) 122 from the port 2 of the first I/O port group. Similarly, the return signal $\lambda_8$ transmitted from the transmitting and receiving apparatus (2) 122 is guided to the port 8 of the second I/O port group in the 16×16 AWG 137, and then sent to the transmitting and receiving apparatus (1) 121 from the port 1 of the first I/O port group. Moreover, the optical signals having the wavelengths $\lambda_6$ and $\lambda_9$, transmitted from the transmitting and receiving apparats (1) 121, for example, are automatically delivered to the transmitting and receiving apparatus (6) 126 and the transmitting and receiving apparatus (9) 129, respectively.

As described above, the full-mesh WDM transmission network device in this embodiment uses the constituent components similar to those of the prior art, and keeps the similar wavelength addressing function, while reducing the accumulation number of the coherent crosstalk lights included in each WDM wavelength light to seven from fifteen, thus realizing higher quality communication. Specifically, the S/N of the received light is improved by 3 dB.

Embodiment 4

Figure 13:
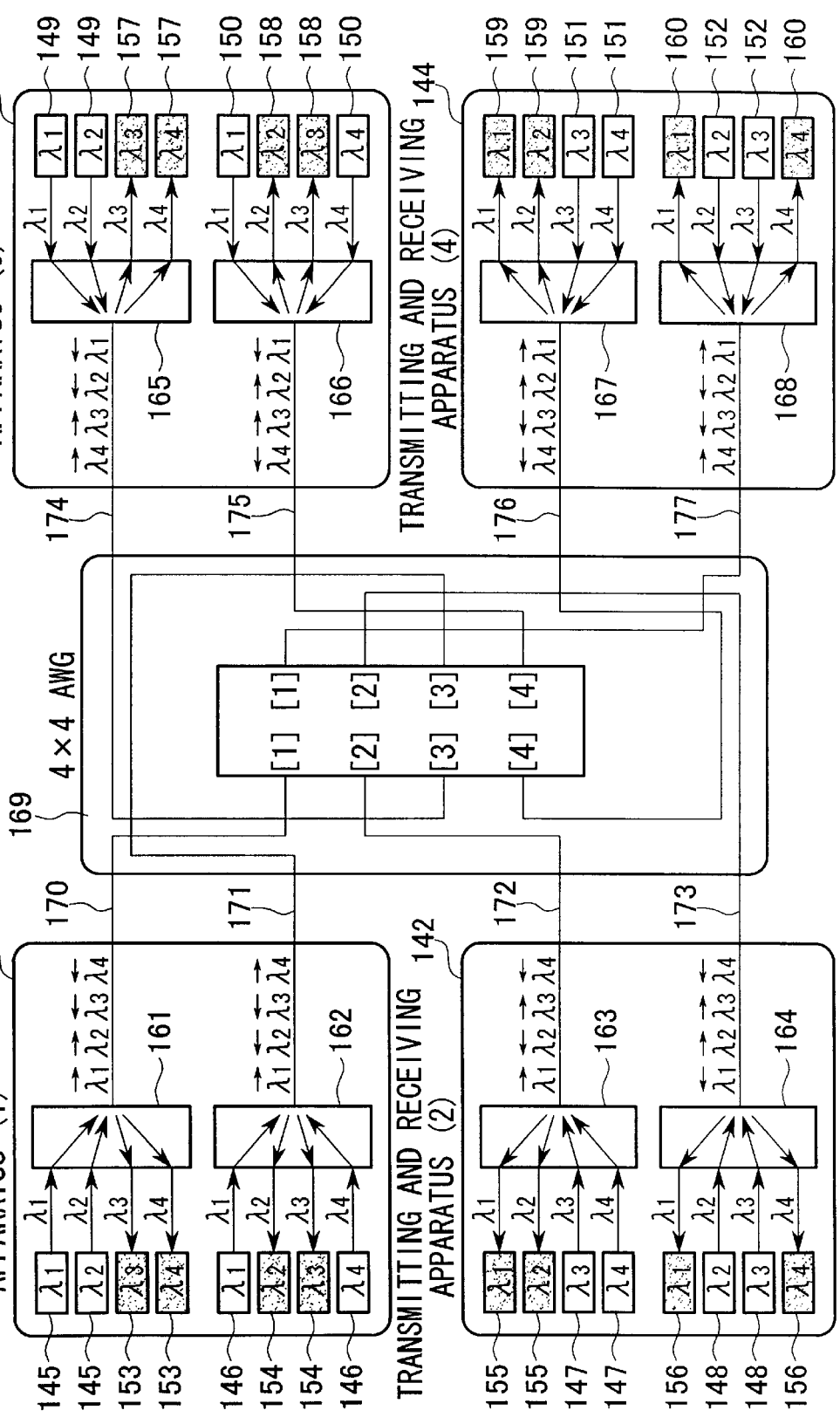
FIG. 13 is a block diagram for explaining a schematic constitution of a fourth embodiment of the present invention.

FIG. 13 is a block diagram for explaining a fourth embodiment of the present invention, which shows a schematic constitution of a full-mesh WDM transmission network device having a different connection constitution from that of the first embodiment, in which the number N is four. Referring to FIG. 13, reference numerals 141 to 144 denote a transmitting and receiving apparatus; 145 to 152, a transmitter for sending a WDM signal (wavelength $\lambda_K$: K=1, 2, 3, 4); 153 to 160, a receiver for receiving a WDM signal (wavelength $\lambda_K$: K=1, 2, 3, 4); 161 to 168, a 1×4 wavelength multi/demultiplexer which multiplexes two optical signals of different wavelengths onto one optical fiber and demultiplexes a WDM signal wavelength-multiplexed on one optical fiber, into two optical signals of different wavelengths; 169, a 4×4 wavelength multi/demultiplexer having a first I/O port group (1 to 4 on the left side) composed off our ports and a second I/O port group (1 to 4 on the right side) composed of four ports, the 4×4 wavelength multi/demultiplexer having a periodic wavelength demultiplexing property in input/output combination; and 170 to 177, an optical fiber for optically connecting each of the transmitting and receiving apparatuses 141 to 144 and the I/O port of each of the 4×4 wavelength multi/demultiplexer 169. In FIG. 13, shown are the wavelengths ($\lambda_K$: K=1, 2, 3, 4) of the WDM signals transmitted on the corresponding optical fibers 170 to 177, the WDM signals being wavelength-multiplexed, and the transmission directions (arrow) thereof.

In this embodiment, as the 1×4 wavelength multi/demultiplexes 161 to 168, a 1×4 AWG was used, and as the 4×4 wavelength multi/demultiplexer 169, a 4×4 AWG having a periodic wavelength demultiplexing property in input/output combination was used. Constituent components including the transmitter, the receiver, the 1×4 AWG, the 4×4 AWG and the optical fiber, which constitute the full-mesh WDM transmission network device of this embodiment, are the same as those of the prior art. Note that although the 1×4 AWG was conventionally used exclusively for the wavelength multiplexer or the wavelength demultiplexing circuit, in this embodiment of the present invention the 1×4 AWG is used for the wavelength multi/demultiplexer which performs the wavelength multiplexing and demultiplexing simultaneously, similarly to the first to third embodiments.

FIG. 14 is a table showing a periodic wavelength demultiplexing property in input/output combination of the 4×4 AWG and a port connection rule between the transmitting and receiving apparatuses and the 4×4 AWG in this embodiment. The wavelength demultiplexing property of the 4×4 AWG has the same periodicity as that of the prior art. However the connection relation between the transmitting and receiving apparatuses and the second I/O port group of the 4×4 AWG is different from that of the prior art similarly to the first to third embodiments. A bi-directional input/output of the optical signal is performed.

Figure 15:
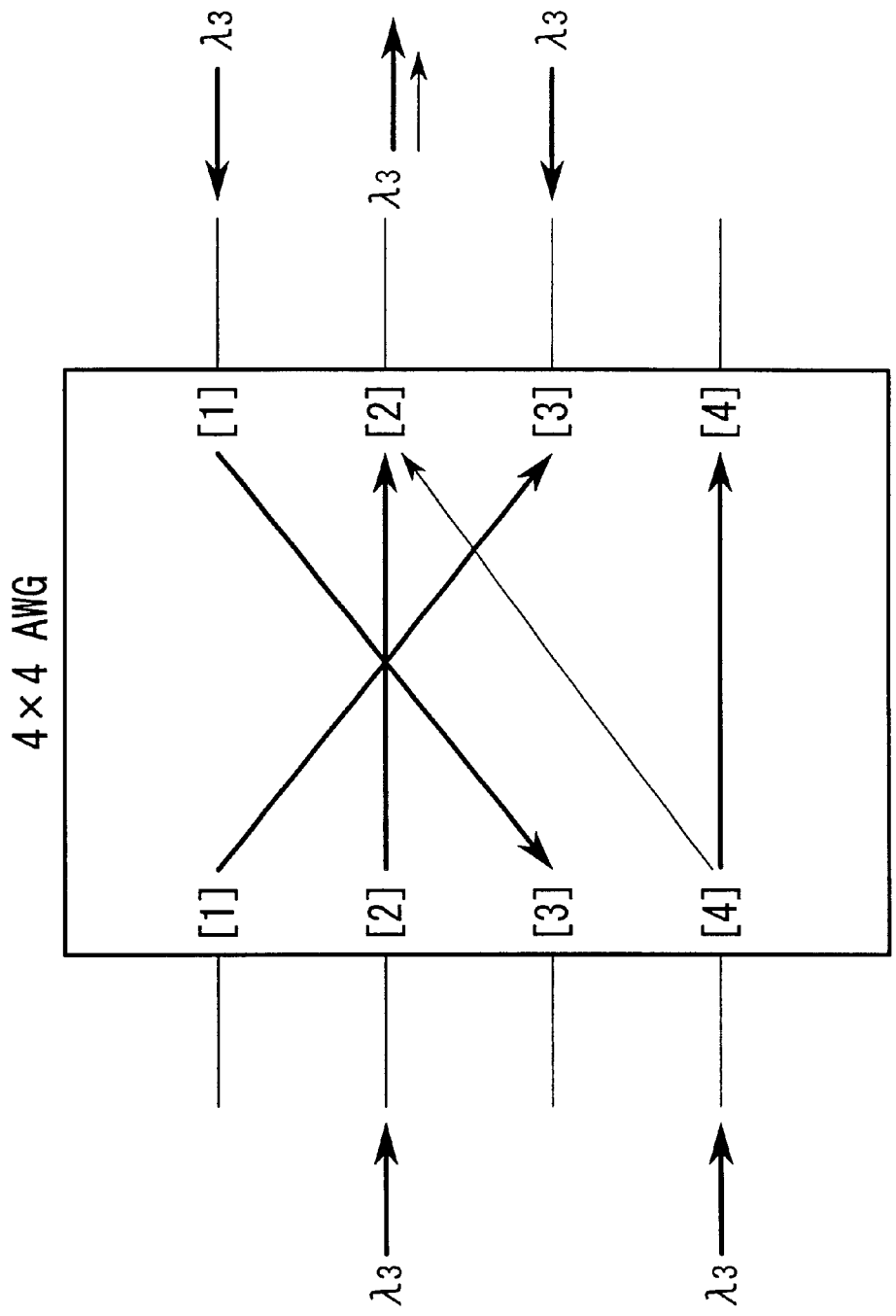
FIG. 15 is a diagram for explaining coherent crosstalk light of the fourth embodiment of the present invention.

In this embodiment, two optical signals among the four optical signals having an equal wavelength are input from the first I/O port group side to the 4×4 AWG, and other two optical signals are input from the second I/O port group side thereto. Since lightwaves which are traveling in opposite directions are independent from each other, a predetermined WDM wavelength light output from the port of the 4×4 AWG includes only one optical signal and one coherent crosstalk light. For example, as shown in FIG. 15, the light having the wavelength $\lambda_3$, which is output from the port 2 of the second I/O port group, includes only the optical signal $\lambda_3$ (thick solid line) input from the port 2 of the first I/O port group and the crosstalk light (thin solid line) of the optical signal $\lambda_3$ input from the port 4 of the first I/O port group, and does not include the crosstalk lights of the optical signals $\lambda_3$ input from the ports 1 and 3 of the second I/O port group. Specifically, the accumulation number of the coherent crosstalk lights is reduced to one from three, which is the accumulation number in the prior art.

In this embodiment, since the two optical signals having the equal wavelength, which are input from the same port group side, are input from the ports which are not adjacent to each other, for example, the ports 1 and 3 or the ports 2 and 4, one coherent crosstalk light included in the output WDM wavelength light from the 4×4 AWG is a nonadjacent crosstalk light. Accordingly, in the full-mesh WDM transmission network device of this embodiment, the S/N of the WDM wavelength light received is expressed as follows.

$$S/N = P_{Signal}/P_{OthCT} \quad (5)$$

The S/N is equal to 40 dB when $P_{othCT}/P_{signal}$ is assumed to be −40 dB, and the S/N is improved by 13 dB compared to 27 dB of the prior art.

Figure 16:
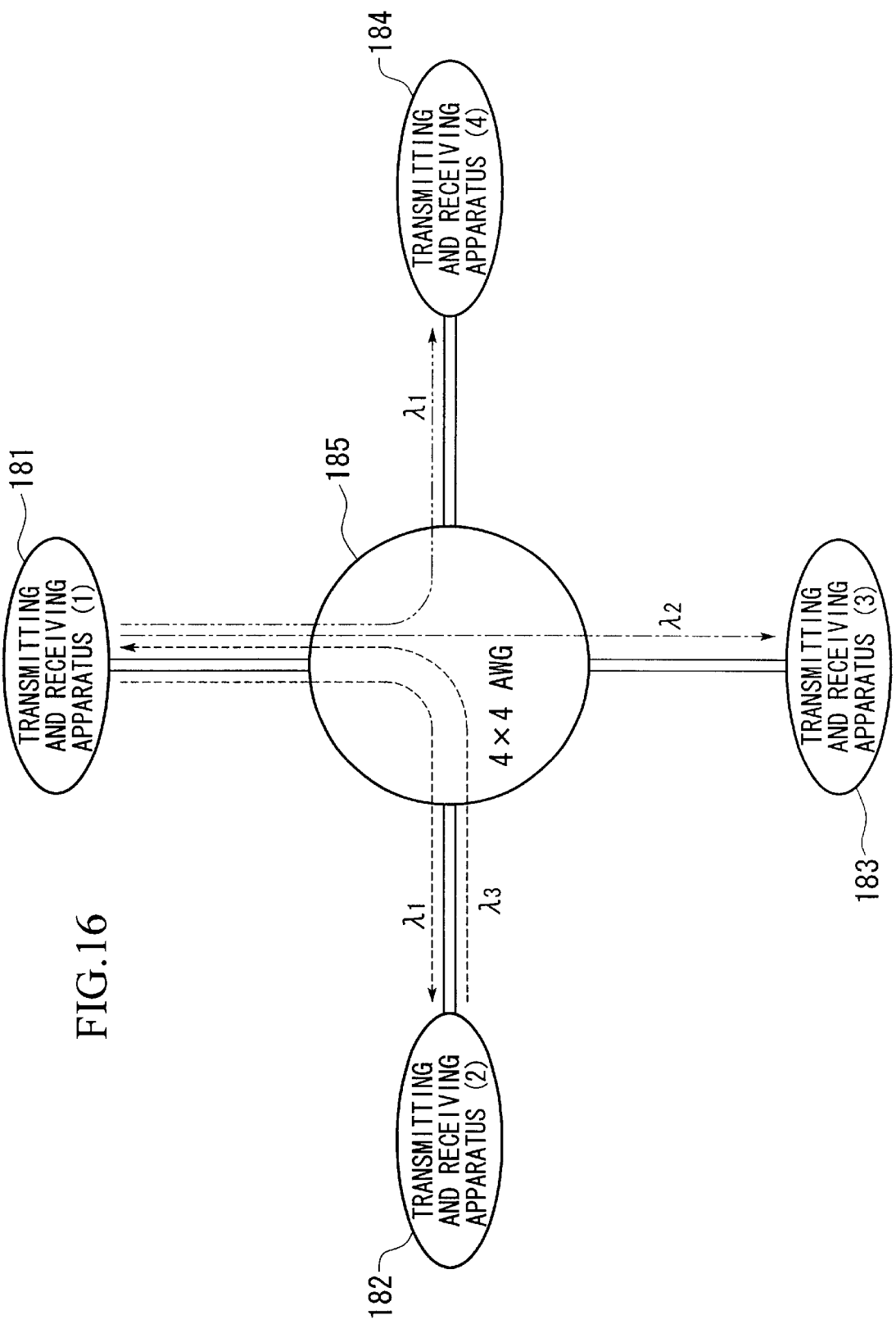
FIG. 16 is a diagram for explaining a wavelength addressing of the fourth embodiment of the present invention.

FIG. 16 is a diagram for explaining wavelength addressing in this embodiment. In FIG. 16, reference numerals 181 to 184 denote four transmitting and receiving apparatuses, and reference numeral 185 denotes 4×4 AWG. The wavelength demultiplexing property of the 4×4 AWG and the connection relation between the transmitting and receiving apparatuses and the 4×4 AWG are explained in FIG. 14. For example, one optical signal having the wavelength $\lambda_1$ transmitted from the transmitting and receiving apparatus (1) 181 is guided to the port 4 of the second I/O port group in the 4×4 AWG 185, and switched within the 4×4 AWG 185. This optical signal is then sent to the transmitting and receiving apparatus (2) 182 from the port 2 of the first I/O port group. Similarly, the return signal $\lambda_2$ returned from the transmitting and receiving apparatus (2) 182 is guided to the port 3 of the second I/O port group in the 4×4 AWG 185, and then sent to the transmitting and receiving apparatus (1) 181 from the port 1 of the first I/O port group. Furthermore, the other optical signal having the wavelength $\lambda_1$, and one optical signal having the wavelength $\lambda_2$, which are transmitted from the transmitting and receiving apparatus (1) 181, are automatically delivered to the transmitting and receiving apparatuses (4) 184 and (3) 183, respectively.

As described above, the full-mesh WDM transmission network device in this embodiment uses the constituent components similar to those of the prior art, and maintains the same wavelength addressing function, while reducing the accumulation number of the coherent crosstalk lights included in each WDM wavelength light to one from three, thus realizing higher quality communication. Specifically, the S/N of the received light is improved by 13 dB.

Note that the table shown in FIG. 14 is strictly an example, and another examples applicable to this embodiment exist. The way to prepare such tables will be explained below.

(1) Connection of the First I/O Port

The port 1 of the first I/O port group is connected to the transmitting and receiving apparatus (1), and the port 2 is connected to the transmitting and receiving apparatus (2). The port 3 is connected to the transmitting and receiving apparatus (3), and the port 4 is connected to the transmitting and receiving apparatus (4).

(2) Determination of Directions of the Optical Signals

Direction of the optical signal in each column of the table (direction of the arrows) will be any one of the following cases 1 to 4.

Case 1. . . . The following optical signals will be directed to the right, and the remaining will be directed to the left.

the optical signal between the port 1 of the first I/O port group and the port 1 of the second I/O port group the optical signal between the port 1 of the first I/O port group and the port 2 of the second I/O port group the optical signal between the port 2 of the first I/O port group and the port 2 of the second I/O port group the optical signal between the port 2 of the first I/O port group and the port 3 of the second I/O port group the optical signal between the port 3 of the first I/O port group and the port 3 of the second I/O port group the optical signal between the port 3 of the first I/O port group and the port 4 of the second I/O port group the optical signal between the port 4 of the first I/O port group and the port 4 of the second I/O port group the optical signal between the port 4 of the first I/O port group and the port 1 of the second I/O port group Case 2. . . . The following optical signals will be directed to the right, and the remaining will be directed to the left.

the optical signal between the port 1 of the first I/O port group and the port 4 of the second I/O port group the optical signal between the port 1 of the first I/O port group and the port 1 of the second I/O port group the optical signal between the port 2 of the first I/O port group and the port 1 of the second I/O port group the optical signal between the port 2 of the first I/O port group and the port 2 of the second I/O port group the optical signal between the port 3 of the first I/O port group and the port 2 of the second I/O port group the optical signal between the port 3 of the first I/O port group and the port 3 of the second I/O port group the optical signal between the port 4 of the first I/O port group and the port 3 of the second I/O port group the optical signal between the port 4 of the first I/O port group and the port 4 of the second I/O port group Case 3. . . . The following optical signals will be directed to the fight and the remaining will be directed to the left.

the optical signal between the port 1 of the first I/O port group and the port 3 of the second I/O port group the optical signal between the port 1 of the first I/O port group and the port 4 of the second I/O port group the optical signal between the port 2 of the first I/O port group and the port 4 of the second I/O port group the optical signal between the port 2 of the first I/O port group and the port 1 of the second I/O port group the optical signal between the port 3 of the first I/O port group and the port 1 of the second I/O port group the optical signal between the port 3 of the first I/O port group and the port 2 of the second I/O port group the optical signal between the port 4 of the first I/O port group and the port 2 of the second I/O port group the optical signal between the port 4 of the first I/O port group and the port 3 of the second I/O port group Case 4. . . . The following optical signals will be directed to the right, and the remaining will be directed to the left.

the optical signal between the port 1 of the first I/O port group and the port 2 of the second I/O port group the optical signal between the port 1 of the first I/O port group and the port 3 of the second I/O port group the optical signal between the port 2 of the first I/O port group and the port 3 of the second I/O port group the optical signal between the port 2 of the first I/O port group and the port 4 of the second I/O port group the optical signal between the port 3 of the first I/O port group and the port 4 of the second I/O port group the optical signal between the port 3 of the first I/O port group and the port 1 of the second I/O port group the optical signal between the port 4 of the first I/O port group and the port 1 of the second I/O port group the optical signal between the port 4 of the first I/O port group and the port 2 of the second I/O port group (3) Connection of the second I/O port group The ports of the second I/O port group and the transmitting and receiving apparatuses (1) to (4) are connected in any one of the following manners.

The port 1 of the second I/O port group is connected to transmitting and receiving apparatus (4), and the port 2 is connected to the transmitting and receiving apparatus (3). The port 3 is connected to the transmitting and receiving apparatus (2) and the port 4 is connected to the transmitting and receiving apparatus (1).

The port 1 of the second I/O port group is connected to the transmitting and receiving apparatus (3), and the port 2 is connected to the transmitting and receiving apparatus (2). The port 3 is connected to the transmitting and receiving apparatus (1) and the port 4 is connected to the transmitting and receiving apparatus (4).

The port 1 of the second I/O port group is connected to the transmitting and receiving apparatus (2), and the port 2 is connected to the transmitting and receiving apparatus (1). The port 3 is connected to the transmitting and receiving apparatus (4) and the port 4 is connected to the transmitting and receiving apparatus (3).

The port 1 of the second I/O port group is connected to the transmitting and receiving apparatus (1), and the port 2 is connected to the transmitting and receiving apparatus (4). The port 3 is connected to the transmitting and receiving apparatus (3) and the port 4 is connected to the transmitting and receiving apparatus (2).

The table is completed by the above-described ways (1) to (3). The table completed in such ways satisfies the following condition ⑥ in addition to the conditions ① to ⑤ described in the first embodiment. Note that in this embodiment N is four.

⑥ The wavelengths of all the optical signals transmitted from any one of the ports of one I/O port group to the other I/O port group, are different from a wavelength of any optical signal transmitted from a port adjacent to the said one port toward the other I/O port group.

Embodiment 5

FIG. 17 is a block diagram for explaining a fifth embodiment of the present invention, which shows a schematic constitution of a full-mesh WDM transmission network device in which the number N is increased to eight compared to the fourth embodiment. Referring to FIG. 17, reference numerals 191 denotes a transmitting and receiving apparatus; 192 and 193, a transmitter for sending a WDM signal (wavelength $\lambda_K$: K=1, 2, 3, . . . , 8); 194 and 195,a receiver for receiving a WDM signal (wavelength $\lambda_K$: K=1, 2, 3, . . . , 8); 196 and 197, a 1×8 wavelength multi/demultiplexer which multiplexes four optical signals of different wavelengths onto one optical fiber and demultiplexes a WDM signal, wavelength-multiplexed onto one optical fiber, into four optical signals; 198, an 8×8 wavelength multi/demultiplexer having a first I/O port group (1 to 8 on the left side) composed of eight ports and a second I/O port group (1 to 8 on the right side) composed of eight ports, the 8×8 wavelength multi/demultiplexer having a periodic wavelength demultiplexing property in input/output combination; and 199 and 200, an optical fiber for optically connecting each of the transmitting and receiving apparatus 191 and the I/O port of the 8×8 wavelength multi/demultiplexer 198. Although the 8×8 wavelength multi/demultiplexer 198 is connected to the eight transmitting and receiving apparatuses, illustrations for the seven transmitting and receiving apparatuses other than the transmitting and receiving apparatus (1) 191 are omitted. In FIG. 17, shown are the wavelengths ($\lambda_K$: K=1, 2, 3, . . . , 8) of the WDM signals transmitted on the corresponding optical fibers 199 and 200, the WDM signals being wavelength-multiplexed, and the transmission directions (arrow) thereof.

In this embodiment, as the 1×8 wavelength multi/demultiplexes 196 and 197, a 1×8 AWG was used, and as the 8×8 wavelength multi/demultiplexer 198, an 8×8 AWG having a periodic wavelength demultiplexing property in input/output combination was used. Constituent components including the transmitter, the receiver, the 1×8 AWG, the 8×8 AWG and the optical fiber, which constitute the full-mesh WDM transmission network device of this embodiment, are the same as those of the prior art. Note that although the 1×8 AWG was conventionally used exclusively for the wavelength multiplexer or the wavelength demultiplexing circuit, in this embodiment the 1×8 AWG is used as the wavelength multi/demultiplexer which performs the wavelength multiplexing and demultiplexing simultaneously, similarly to the first to fourth embodiments.

FIG. 18 is a table showing a periodic wavelength demultiplexing property in input/output combination of the 8×8 AWG and a port connection rule between the transmitting and receiving apparatuses and the 8×8 AWG in this embodiment. The wavelength demultiplexing property of the 8×8 AWG has the same periodicity as that of the prior art. However the connection relation between the transmitting and receiving apparatuses and the second I/O port group of the 4×4 AWG is different from that of the prior art, similarly to the first to third embodiments. A bi-directional input/output of the optical signal is performed.

Figure 19:
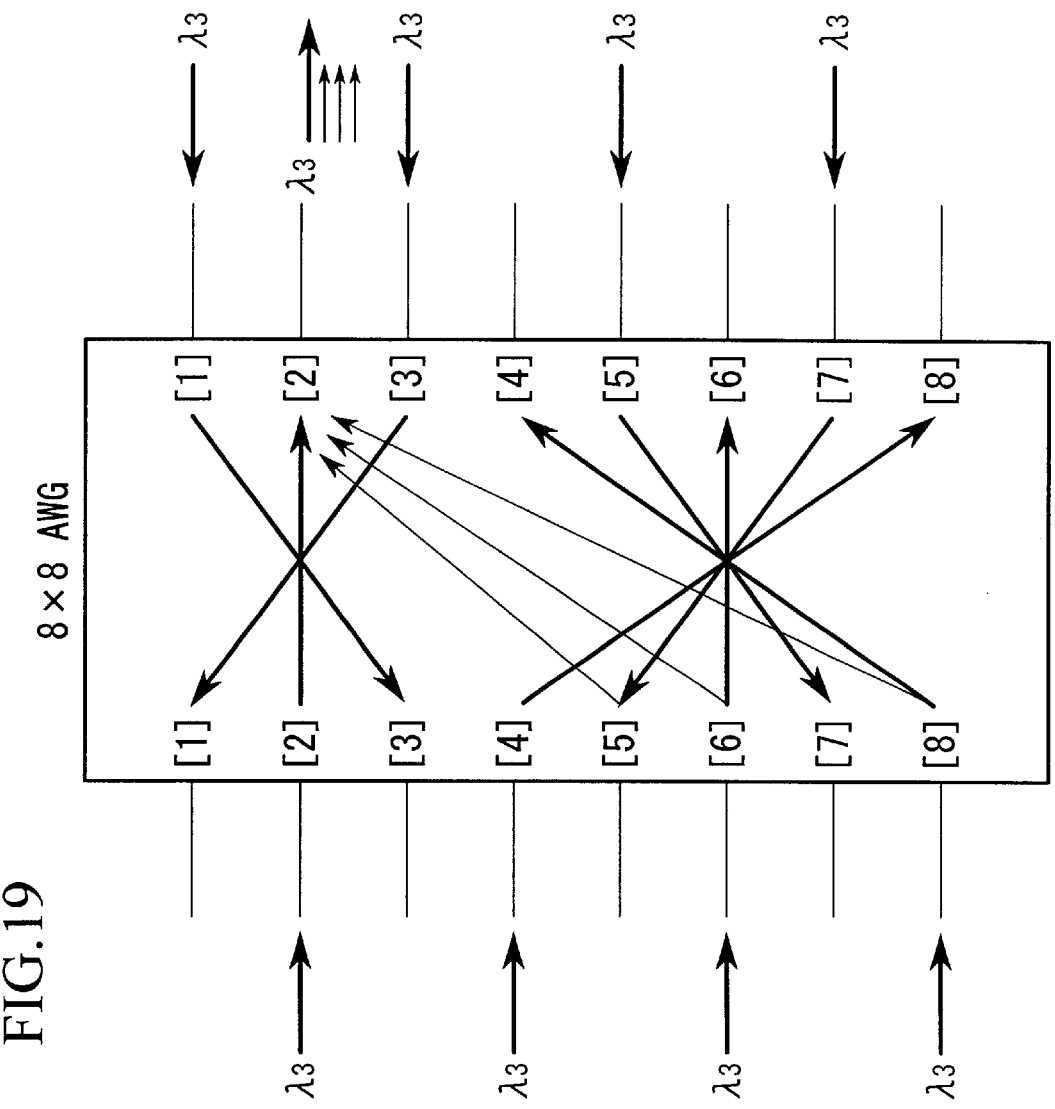
FIG. 19 is a diagram for explaining coherent crosstalk light of the fifth embodiment of the present invention.

In this embodiment, the four optical signals among the eight optical signals having the equal wavelength are input from the first I/O port group side to the 8×8 AWG, and other four optical signals are input from the second I/O port group side thereto. Since lightwaves which are traveling in opposite directions are independent from each other, a predetermined WDM wavelength light output from the port of the 8×8 AWG includes only one optical signal and thee coherent crosstalk lights. For example, as shown in FIG. 19, the light having the wavelength $\lambda_3$, which is output from the port 2 of the second I/O port group, includes only the optical signal $\lambda_3$ (thick solid line) input from the port 2 of the first I/O port group and the crosstalk lights (thin solid line) of the optical signals $\lambda_3$ input from the ports 4, 6, and 8 of the first I/O port group, and does not include the crosstalk lights of the optical signals $\lambda_3$ input from the ports 1, 3, 5, and 7 of the second I/O port group. Specifically, the accumulation number of the coherent crosstalk lights is reduced to three from seven that is the accumulation number in the prior art.

In this embodiment since the four optical signals having the equal wavelength which are input from the same port group side, are input from either the ports 1, 3, 5, and 7 or the ports 2, 4, 6, and 8, which are not adjacent to each other, three coherent crosstalk lights included in the output WDM wavelength light from the 8×8 AWG are non-adjacent crosstalk lights. Accordingly, in the full-mesh WDM transmission network device of this embodiment the S/N of the WDM wavelength light received is expressed as follows.

$$S/N = P_{Signal}/3P_{OthCT} \qquad (6)$$

The S/N is equal to 35 dB when $P_{othCT}/P_{signal}$ is assumed to be −40 dB, and the S/N is improved by 9 dB compared to 26 dB in the prior art.

Figure 20:
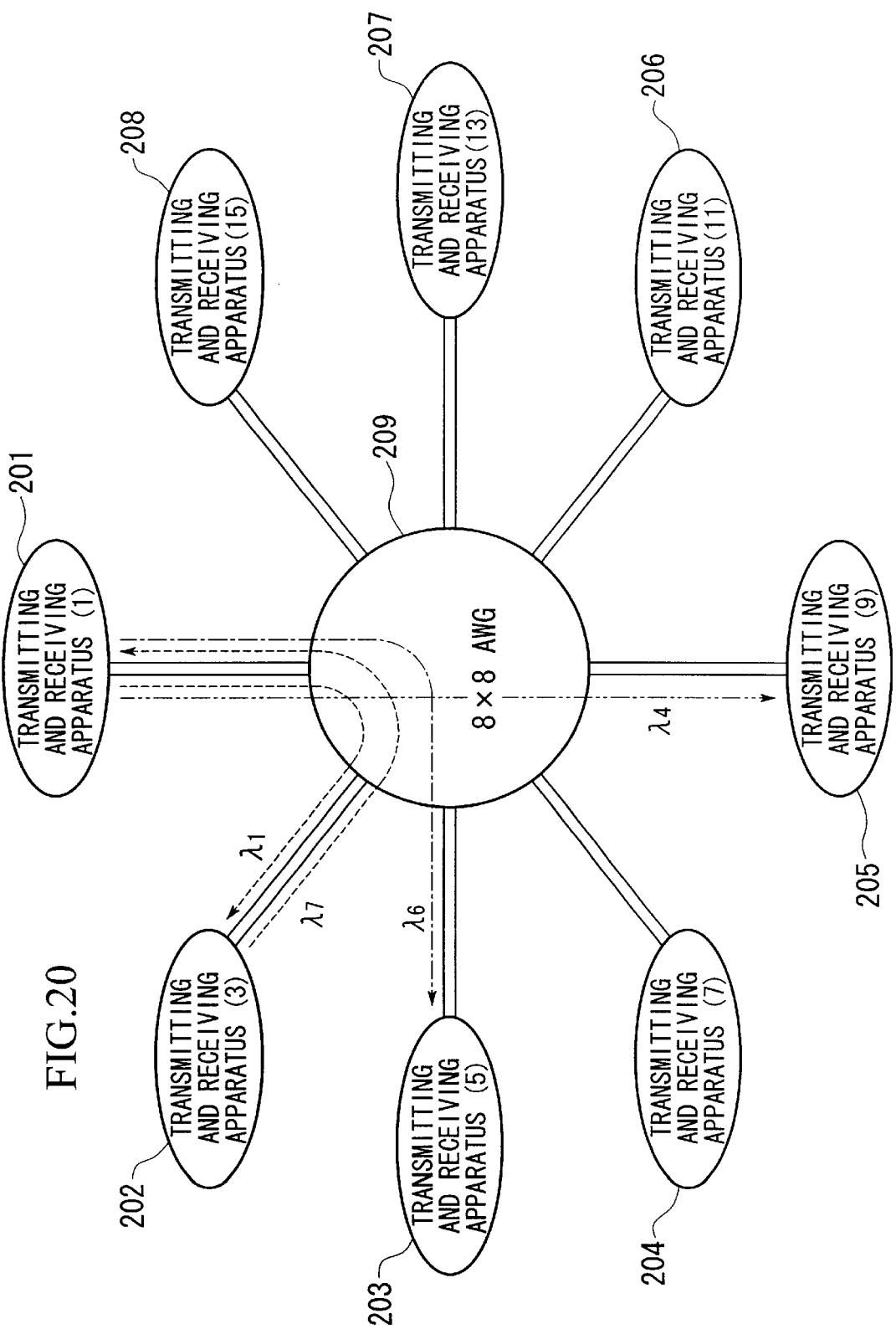
FIG. 20 is a diagram for explaining a wavelength addressing of the fifth embodiment of the present invention.

FIG. 20 is a diagram for explaining wavelength addressing in this embodiment. In FIG. 20, reference numerals 201 to 208 denote eight transmitting and receiving apparatuses, and reference numeral 209 denotes an 8×8 AWG. The wavelength demultiplexing property of the 8×8 AWG and the connection relation between the transmitting and receiving apparatuses and the ports of the 8×8 AWG are explained in FIG. 18. For example, one optical signal having the wavelength $\lambda_1$ transmitted from the transmitting and receiving apparatus (1) 201 is guided to port 8 of the second I/O port group of the 8×8 AWG 209, and switched within the 8×8 AWG 209. This optical signal is then sent to the transmitting and receiving apparatus (2) 202 from the port 2 of the first I/O port group. Similarly, the return signal $\lambda_7$ returned from the transmitting and receiving apparatus (2) 202 is guided to the port 7 of the second I/O port group in the 8×8 AWG 209, and then sent to the transmitting and receiving apparatus (1) 201 from the port 1 of the first I/O port group. Furthermore, the optical signals having the wavelengths $\lambda_4$ and $\lambda_6$, which are transmitted from the transmitting and receiving apparatus (1) 201, for example, are automatically delivered to the transmitting and receiving apparatuses (5) 205 and (3) 203, respectively.

As described above, the full-mesh WDM transmission network device in this embodiment uses the constituent components similar to those of the prior art, and keeps the similar wavelength addressing function, while reducing the accumulation number of the coherent crosstalk lights included in each WDM wavelength light to three from seven, thus realizing higher quality communication. Specifically, the S/N of the received light is improved by 9 dB.

Embodiment 6

FIG. 21 is a block diagram for explaining a sixth embodiment of the present invention, which shows a schematic constitution of a full-mesh WDM transmission network device in which the number N is increased to sixteen compared to the fourth and fifth embodiments. Referring to FIG. 21, reference numerals 211 denotes a transmitting and receiving apparatus; 212 and 213, a transmitter for sending a WDM signal (wavelength $\lambda_K$: K=1, 2, 3, . . . , 16); 214 and 215, a receiver for receiving a WDM signal (wavelength $\lambda_K$: K=1, 2, 3, . . . , 16); 216 and 217, a 1×16 wavelength multi/demultiplexer which multiplexes eight optical signals of different wavelengths onto one optical fiber and demultiplexes a WDM signal wavelength-multiplexed on one optical fiber, into eight optical signals of different wavelengths; 218, a 16×16 wavelength multi/demultiplexer having a first I/O port group (1 to 16 on the left side) composed of sixteen ports and a second I/O port group (1 to 16 on the right side) composed of sixteen ports, the 16×16 wavelength multi/demultiplexer having a periodic wavelength demultiplexing property in input output combination; and 219 and 220, an optical fiber for optically connecting each of the transmitting and receiving apparatus 211 and the I/O port of the 16×16 wavelength multi/demultiplexer 218. Although the 16×16 wavelength multi/demultiplexer 218 is connected to the sixteen transmitting and receiving apparatuses, illustrations for the fifteen transmitting and receiving apparatuses other than the transmitting and receiving apparatus (1) 211 are omitted. In FIG. 21, shown are the wavelengths ($\lambda_K$: K 1, 2, 3, . . . , 16) of the WDM signals transmitted on the corresponding optical fibers 219 and 220, the WDM signals being wavelength-multiplexed, and the transmission directions (arrow) thereof.

In this embodiment, as the 1×16 wavelength multi/demultiplexes 216 and 217, a 1×16 AWG was used, and as the 16×16 wavelength multi/demultiplexer 218, a 16×16 AWG having a periodic wavelength demultiplexing property in input/output combination was used. Constituent components including the transmitter, the receiver, the 1×16 AWG, the 16×16 AWG and the optical fiber, which constitute the fir-mesh WDM transmission network device of this embodiment, are the same as those of the port art. Note that although the 1×16 AWG was conventionally used exclusively for the wavelength multiplexer or the wavelength demultiplexing circuit, in this embodiment the 1×16 AWG is used as the wavelength multi/demultiplexer which performs the wavelength multiplexing and demultiplexing simultaneously, similarly to the first to fifth embodiments.

FIG. 22 is a table showing a periodic wavelength demultiplexing property in input/output combination of the 16×16 AWG and a port connection rule between the transmitting and receiving apparatuses and the 16×16 AWG in this embodiment. The wavelength demultiplexing property of the 16×16 AWG has the same periodicity as that of the prior art. However the connection relation between the transmitting and receiving apparatuses and the second I/O port group of the 16×16 AWG is different from that of the prior art, similarly to the first to fifth embodiments. A bi-directional input/output of the optical signal is performed.

Figure 23:
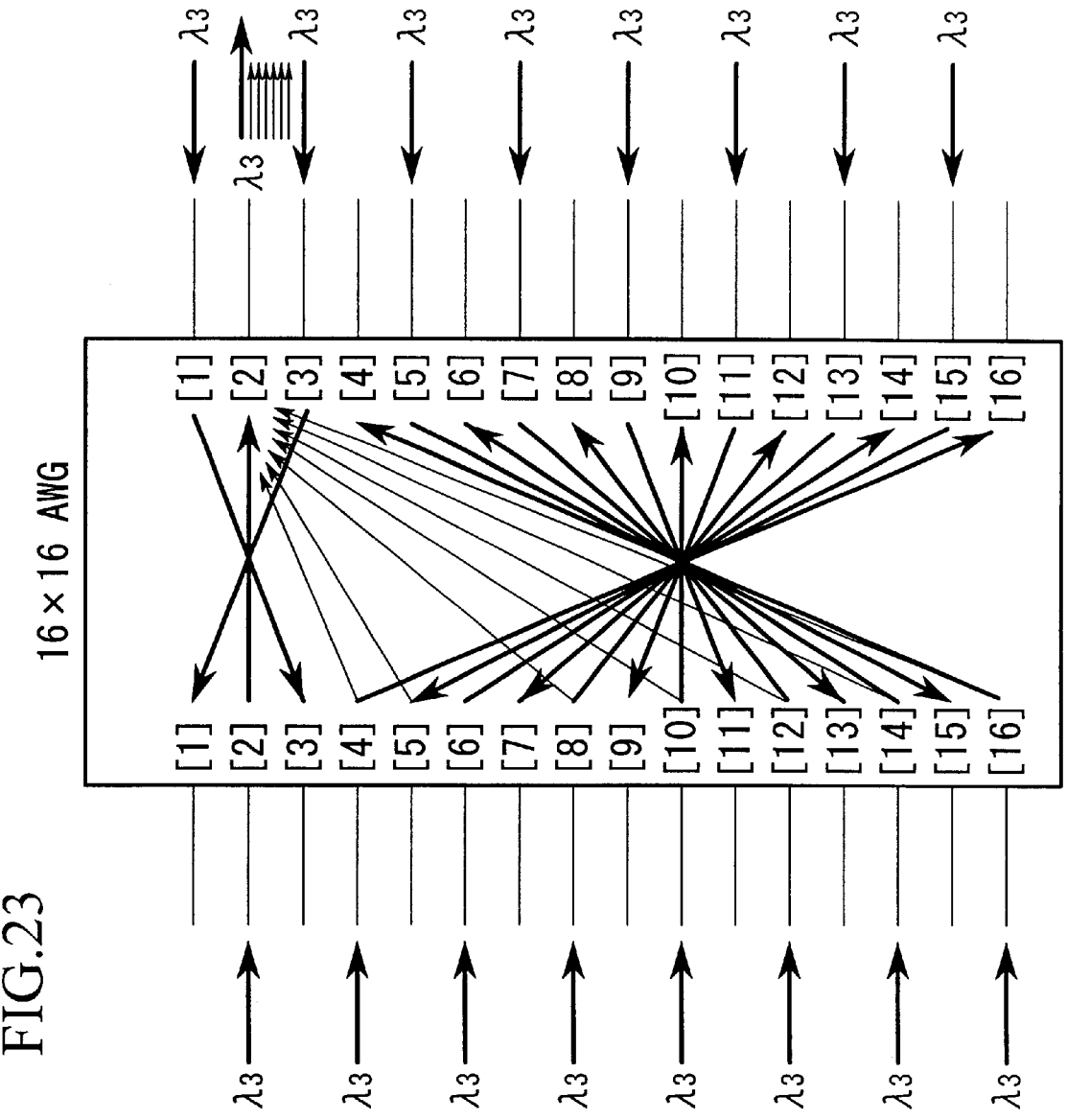
FIG. 23 is a diagram for explaining coherent crosstalk light of the sixth embodiment of the present invention.

In this embodiment eight optical signals among the sixteen optical signals having the equal wavelength are input from the first I/O port group side to the 16×16 AWG, and other eight optical signals are input from the second I/O port group side thereto. Since lightwaves which are traveling in opposite directions are independent from each other, a predetermined WDM wavelength light output from the port of the 16×16 AWG includes only one optical signal and seven coherent crosstalk lights. For example, as shown in FIG. 23, the light having the wavelength $\lambda_3$, which is output from the port 2 of the second I/O port group, includes only the optical signal $\lambda_3$ (thick solid line) input from the port 2 of the first I/O port group and the crosstalk lights (thin solid line) of the optical signals $\lambda_3$ input from the ports 4, 6, 8, 10, 12, 14, and 16 of the first I/O port group, and does not include the crosstalk lights of the optical signals $\lambda_3$ input from the ports 1, 3, 5, 7, 9, 11, 13, and 15 of the second I/O port group. Specifically, the accumulation number of the coherent crosstalk lights is reduced to seven from fifteen hat is the accumulation number in the prior art.

In this embodiment, since the eight optical signals having the equal wavelength, which are input from the same port group side, are input from either the ports 1, 3, 5, 7, 9, 11, 13, and 15 or the ports 2, 4, 6, 8, 10, 12, 14, and 16 which are not adjacent to each other, seven coherent crosstalk lights included in the output WDM wavelength light from the 16×16 AWG are non-adjacent crosstalk lights. Accordingly, in the full-mesh WDM transmission network device of this embodiment, the S/N of the WDM wavelength light received is expressed as follows:

$$S/N = P_{Signal}/7P_{OthCT} \quad (7)$$

The S/N is equal to 32 dB when $P_{otheCT}/P_{signal}$ is assumed to be −40 dB, and the S/N is improved by 7 dB compared to 25 dB in the prior art.

Figure 24:
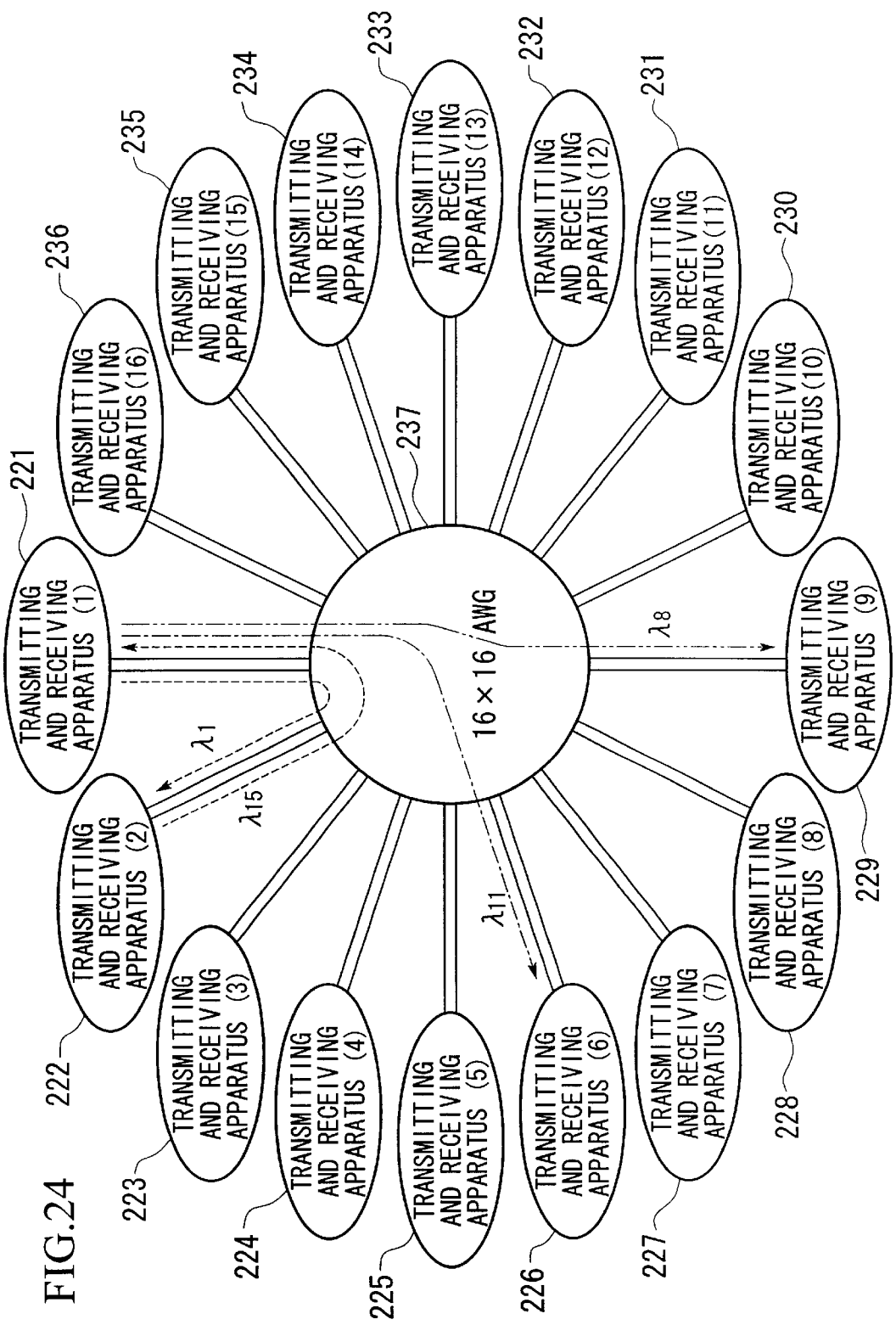
FIG. 24 is a diagram for explaining a wavelength addressing of the sixth embodiment of the present invention.
Figure 25:
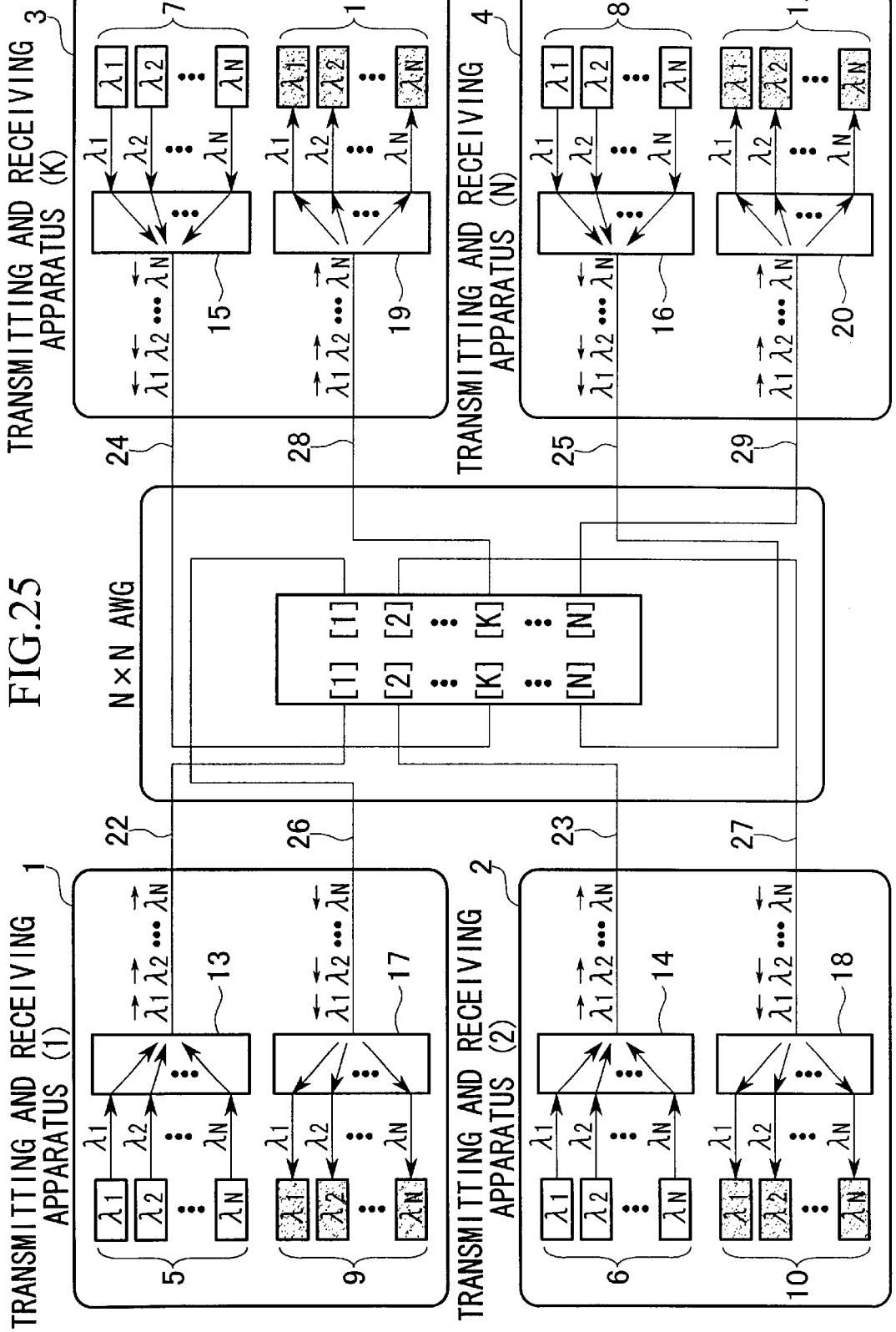
FIG. 25 is a block diagram showing a schematic constitution of a conventional device.
Figure 27:
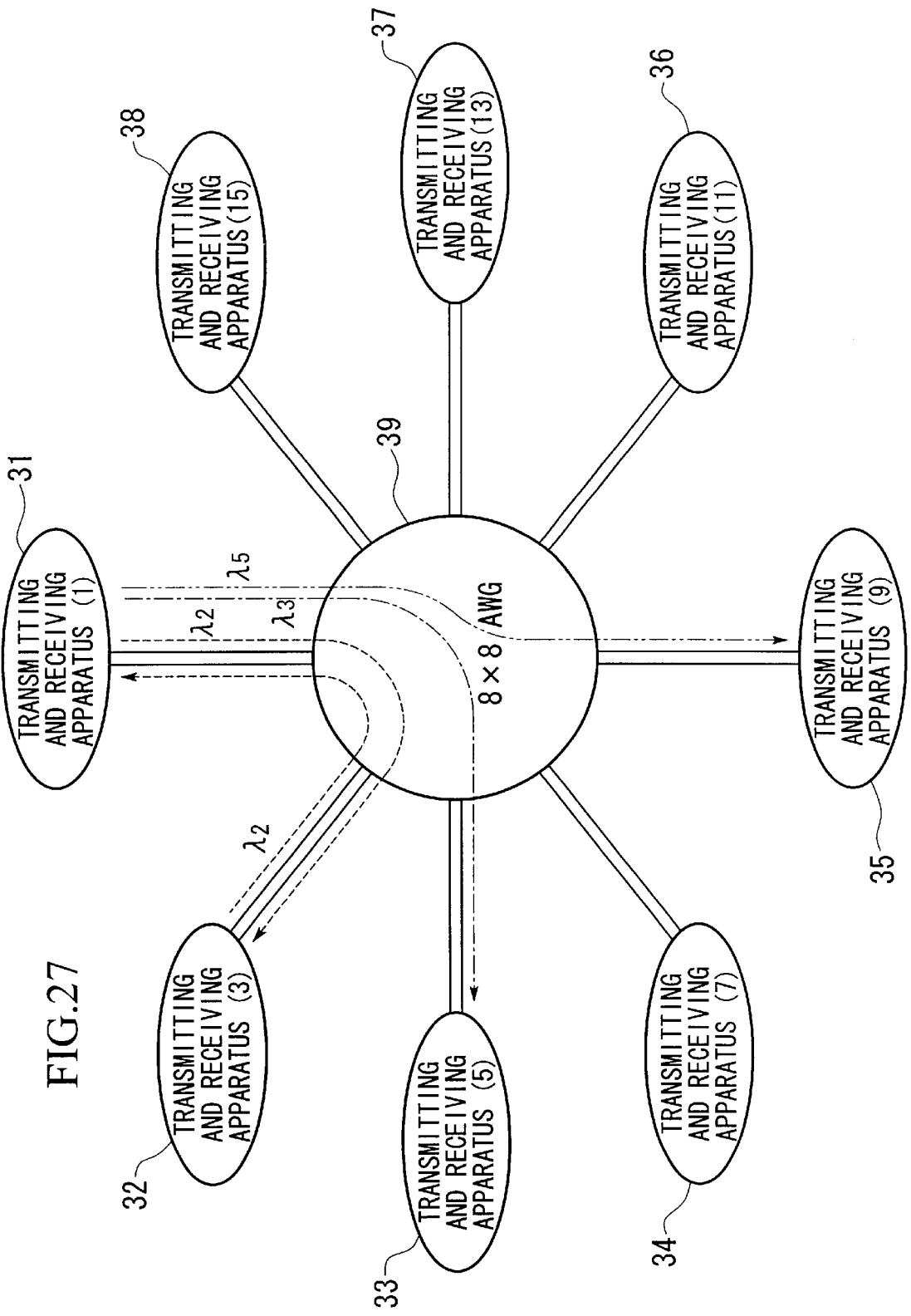
FIG. 27 is a diagram for explaining a wavelength addressing of a conventional device.
Figure 28:
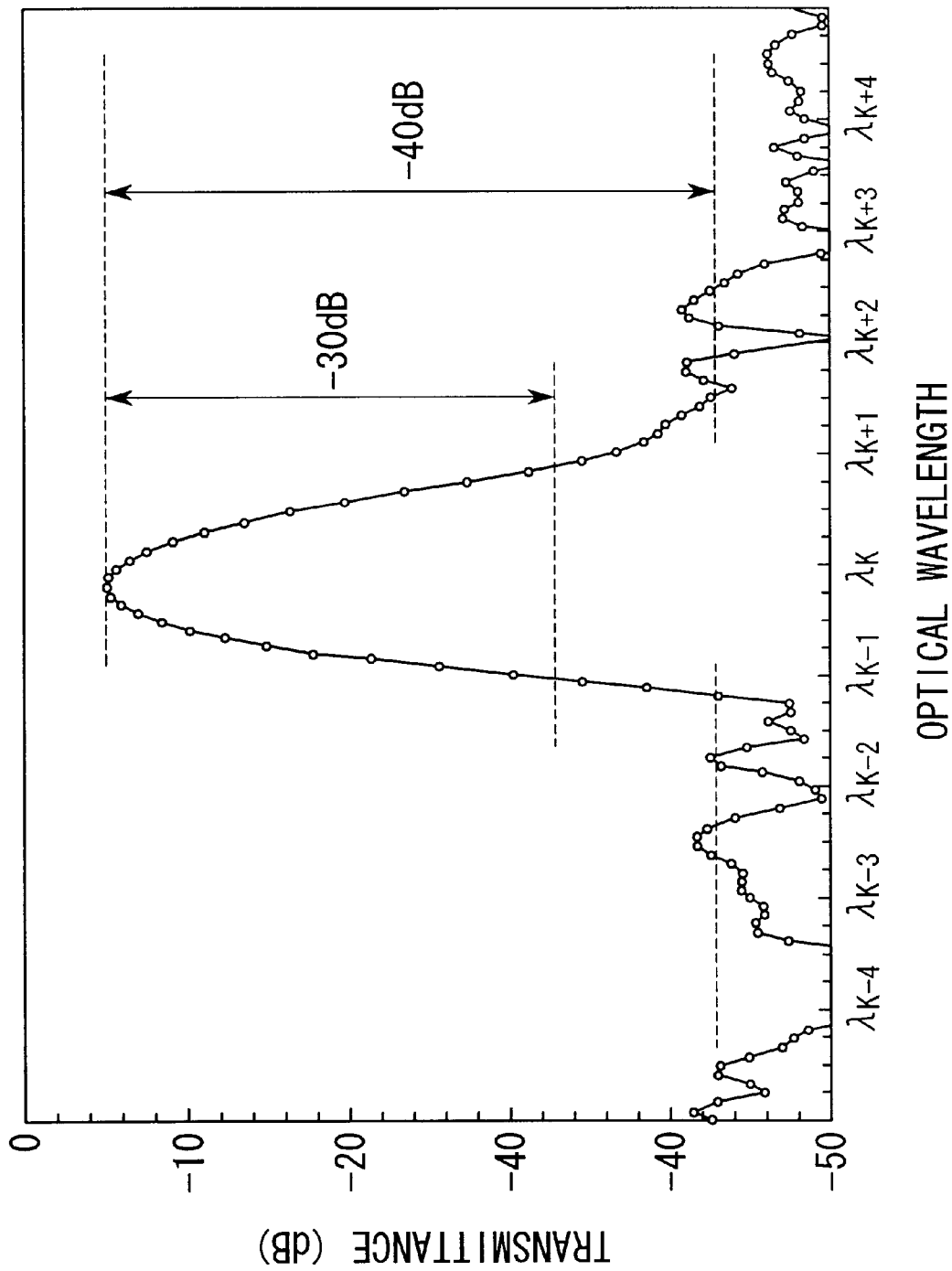
FIG. 28 is a graph showing an example of a transmission spectrum characteristic between input/output ports of a silica-based planar AWG.
Figure 29:
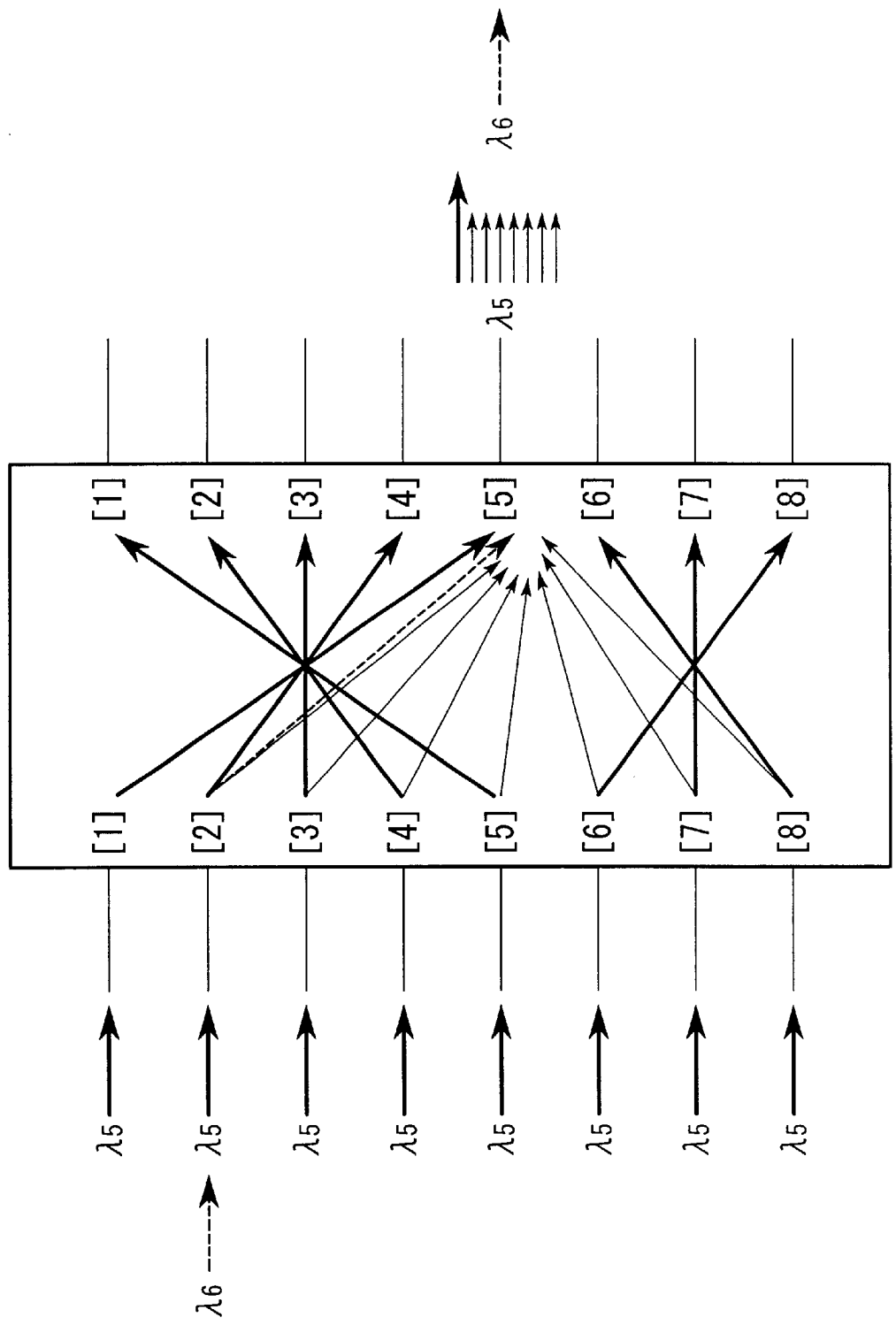
FIG. 29 is a diagram for explaining coherent crosstalk light of the conventional device.

FIG. 24 is a diagram for explaining wavelength addressing in this embodiment. In FIG. 24, reference numerals 221 to 236 denote sixteen transmitting and receiving apparatuses, and reference numeral 237 denotes a 16×16 AWG. The wavelength demultiplexing property of the 16×16 AWG and the connection relation between the transmitting and receiving apparatuses and the ports of the 16×16 AWG are explained in FIG. 22. For example, one optical signal having the wavelength $\lambda_1$ transmitted from the transmitting and receiving apparatus (1) 221 is guided to the port 16 of second I/O port group of the 16×16 AWG 237, and switched within the 16×16 AWG 237. This optical signal is then sent to the transmitting and receiving apparatus (2) 222 from the port 2 of the first I/O port group. Similarly, the return signal $\lambda_{15}$ returned from the transmitting and receiving apparatus (2) 222 is guided to the port 15 of the second I/O port group in the 16×16 AWG 237, and then sent to the transmitting and receiving apparatus (1) 221 from the port 1 of the first I/O port group. Furthermore, the optical signals having the wavelengths $\lambda_8$ and $\lambda_{11}$, which are transmitted from the transmitting and receiving apparatus (1) 221, for example, are automatically delivered to the transmitting and receiving apparatuses (9) 229 and (6) 226, respectively.

As described above, the full-mesh WDM transmission network device in this embodiment uses the constituent components similar to those of the prior art and maintains the same wavelength addressing function, while reducing the accumulation number of the coherent crosstalk lights included in each WDM wavelength light to seven from fifteen, thus realizing higher quality communication. Specifically, the S/N of the received light is improved by 7 dB.

Although the full-mesh optical wavelength division multiplexing transmission network device of the present invention in which N is 4, 8 and 16 in six embodiments, was described, as a matter of course, it is possible to constitute the full-mesh optical wavelength division multiplexing transmission network device of the present invention even when N takes any value. Moreover, the connection relation between the transmitting and receiving apparatuses and the ports of the N×N AWG and the combinations of the transmitting directions of the optical signals between I/O ports in the N×N AWG are not limited to those illustrated in FIGS. 2, 6, 10, 14, 18 and 22. It is apparent that other connection relations and other combinations, by which the operations similar to those of the embodiments can be realized, are within the spirit and scope of the present invention.

What is claimed is:

1. An optical wavelength division multiplexing transmission network device; comprising N transmitting and receiving apparatuses; and an N×N wavelength multi/demultiplexer having a first I/O part group composed of N ports, each of which is connected to each different one of said N transmitting and receiving apparatuses and a second I/O port group composed of N ports, each of which is connected to each different one of said N transmitting and receiving apparatuses, wherein each of N optical signals, which has a different wavelength from the others, is transmitted at each of N paths between any one of the ports of the first I/O port group and N ports of the second I/O port group, each of N optical signals, which has a different wavelength from the others, is transmitted at each of N paths between any one of the ports of the second I/O port group and N ports of the first I/O port group, N port combinations for transmitting optical signals having an equal wavelength exists for each wavelength among N×N port combinations made by the N ports of the first I/O port group and the N ports of the second I/O port group, among the N port combinations for transmitting the optical signals having the equal wavelength, in M port combinations the optical signals are transmitted from the first I/O port group to the second I/O port group, and in N−M port combinations the optical signals are transmitted from the second I/O port group to the first I/O port group, and the port of the second I/O port group to which the optical signal is transmitted from the port of the first I/O port group connected to the any one of the transmitting and receiving apparatuses and the port of the first I/O port group to which the optical signal is transmitted from the port of the second I/O port group connected to the any one of the transmitting and receiving apparatuses are connected to the different transmitting and receiving apparatus.

2. The optical wavelength division multiplexing transmission network device according to claim 1, wherein N is an even number and M is equal to N/2.

3. The optical wavelength division multiplexing transmission network device according to claim 2, wherein wavelengths of all optical signals transmitted from one of the ports of one I/O port group to the other I/O port group are different those of all optical signals transmitted from a port adjacent to the said one port of the one I/O port group to the other I/O port group.

4. The optical wavelength division multiplexing transmission network device according to claim 2, Wherein said transmitting and receiving apparatus includes:
N−M transmitters;
M receivers;
a 1×N wavelength multi/demultiplexer which demultiplexes an optical signal output from predetermined one port of the first I/O port group into M optical signals having different wavelengths, inputs the demultiplexed optical signals to the different receivers among the M receivers, multiplexes optical signals output from said N−M transmitters to one optical signal, and transmits the multiplexed optical signal to predetermined one port of the first I/O port group;
M transmitters;
N−M receivers; and
a 1×N wavelength multi/demultiplexer which demultiplexes an optical signal output from predetermined one port of the second I/O port group into N−M optical signals having different wavelengths, inputs the demultiplexed optical signals to the different receivers among the N−M receivers, multiplexes optical signal output from said M transmitters into one optical signal, and transmits the multiplexed optical signal to predetermined one port of the first I/O port group.

5. The optical wavelength division multiplexing transmission network device according to claim 1, wherein wavelengths of all optical signals transmitted from any one of the ports of one I/O port group to the other I/O port group are different from those of all optical signals transmitted from a port adjacent to the said one port of the one I/O port group to the other I/O port group.

6. The optical wavelength division multiplexing transmission network device according to claim 5, wherein said transmitting and receiving apparatus includes:
N−M transmitters;
M receivers;
A 1×N wavelength multi/demultiplexer which demultiplexes an optical signal output from predetermined one port of the first I/O port group into M optical signals having different wavelengths, inputs the demultiplexed optical signals to the different receivers among the M receivers, multiplexes optical signals output from said N−M transmitters to one optical signal, and transmits the multiplexed optical signal to predetermined one port of the first I/O port group;
M transmitters;
N−M receivers; and
A 1×N wavelength multi/demultiplexer which demultiplexes an optical signal output from predetermined one port of the second I/O port group into N−M Optical signals having different wavelengths, inputs the demultiplexed optical signals to the different receivers among the N−M receivers, multiplexes optical signal output from said M transmitters into one optical signal, and transmits the multiplexed optical signal to predetermined one port of the first I/O port group.

7. The optical wavelength division multiplexing transmission network device according to claim 1, wherein said transmitting and receiving apparatus includes:
N−M transmitters;
M receivers;
a 1×N wavelength multi/demultiplexer which demultiplexes an optical signal output from predetermined one port of the first I/O port group into M optical signals having different wavelengths, inputs the demultiplexed optical signals to the different receivers among the M receivers, multiplexes optical signals output from said N−M transmitters to one optical signal, and transmits the multiplexed optical signal to predetermined one port of the first I/O port group;
M Transmitters;
N−M receivers; and
a 1×N wavelength multi/demultiplexer which demultiplexes an optical signal output from predetermined one port of the second I/O port group into N−M optical signals having different wavelengths, inputs the demultiplexed optical signals to the different receivers among the N−M receivers, multiplexes optical signals output from said M transmitters into one optical signal, and transmits the multiplexed optical signal to predetermined one port of the first I/O port group.

* * * * *